(12) United States Patent
Taniguchi et al.

(10) Patent No.: US 10,027,252 B2
(45) Date of Patent: Jul. 17, 2018

(54) ROTATING ELECTRIC MACHINE SYSTEM

(71) Applicant: DENSO CORPORATION, Kariya, Aichi-pref (JP)

(72) Inventors: Makoto Taniguchi, Kariya (JP); Asaka Kimura, Kariya (JP); Keiji Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/651,047

(22) Filed: Jul. 17, 2017

(65) Prior Publication Data

US 2018/0019687 A1    Jan. 18, 2018

(30) Foreign Application Priority Data

Jul. 15, 2016    (JP) .................................. 2016-140809

(51) Int. Cl.
*H02P 27/06*    (2006.01)
*H02M 7/5387*    (2007.01)

(52) U.S. Cl.
CPC .......... *H02M 7/5387* (2013.01); *H02P 27/06* (2013.01)

(58) Field of Classification Search
CPC ........................................... H02P 27/00–27/18
USPC ........................ 318/400.26–400.29
See application file for complete search history.

(56) References Cited

U.S. PATENT DOCUMENTS

| | | | | |
|---|---|---|---|---|
| 4,570,212 A | * | 2/1986 | Edwards | H02M 7/521 361/100 |
| 5,936,855 A | * | 8/1999 | Salmon | H02M 1/4216 363/46 |
| 7,176,653 B2 | * | 2/2007 | Jahkonen | H02M 1/088 318/503 |
| 9,705,313 B2 | * | 7/2017 | Yamada | H02H 9/02 |

FOREIGN PATENT DOCUMENTS

| | | |
|---|---|---|
| JP | H11-332288 A | 11/1999 |
| JP | H11-356082 A | 12/1999 |

* cited by examiner

*Primary Examiner* — Bentsu Ro
(74) *Attorney, Agent, or Firm* — Oliff PLC

(57) ABSTRACT

A rotating electric machine system includes a rotating electric machine and an electric power conversion circuit. The rotating electric machine includes N coils connected with each other to define a neutral point therebetween. The electric power conversion circuit includes N high-side switches, N low-side switches, a selector switch, a full-wave driver, a half-wave driver and a drive controller. The full-wave driver performs a full-wave drive process with high potential-side terminals of the low-side switches respectively connected with low potential-side terminals of the high-side switches by the selector switch. The half-wave driver performs a half-wave drive process with the high potential-side terminals of the low-side switches connected with the neutral point by the selector switch. The drive controller controls both the full-wave driver and the half-wave driver to selectively cause either the full-wave driver to perform the full-wave drive process or the half-wave driver to perform the half-wave drive process.

15 Claims, 12 Drawing Sheets

ROTATING ELECTRIC MACHINE SYSTEM

CROSS-REFERENCE TO RELATED APPLICATION

This application is based on and claims priority from Japanese Patent Application No. 2016-140809 filed on Jul. 15, 2016, the content of which is hereby incorporated by reference in its entirety into this application.

BACKGROUND

1 Technical Field

The present invention relates to rotating electric machine systems that are installed in, for example, motor vehicles and include a rotating electric machine and an electric power conversion circuit between which electric power is transferred.

2 Description of Related Art

There are known rotating electric machine systems that are installed in, for example, motor vehicles and include a rotating electric machine and an electric power conversion circuit between which electric power is transferred.

When the rotating electric machine is used as an electric motor in a wide rotational speed range, it is necessary to realize a required performance of the rotating electric machine in each of a low-speed region and a high-speed region.

To this end, it may be considered to further employ a DC-DC converter and drive the rotating electric machine with the voltage applied to the machine varied by the DC-DC converter, thereby realizing the required performance. However, in this case, the system cost would be considerably increased.

Alternatively, it may be considered to switch, during operation of the rotating electric machine, the electrical connection of a stator coil of the rotating electric machine between a Δ-connection suitable for high-speed operation and a star-connection (or Y-connection) suitable for high-torque operation, thereby realizing the required performance. However, in this case, the system configuration would become complicated. Moreover, it would become necessary to stop the operation of the rotating electric machine once each time the electrical connection of the stator coil is switched.

Japanese Patent Application Publication No. JPH11332288A discloses a motor drive circuit which performs, for a motor, a full-wave drive process in a low-speed region and a half-wave drive process in a high-speed region. Specifically, the motor drive circuit includes a three-phase inverter that is configured with high-side switches and low-side switches. Moreover, high potential-side terminals of the high-side switches are electrically connected to a neutral point between three phase coils of the motor via a semiconductor element such as a transistor. In the half-wave drive process, the on-off switching of the low-side switches are controlled with the semiconductor element kept on and the high-side switches kept off. In addition, such a half-wave drive process is also disclosed in Japanese Patent Application Publication No. JPH11356082A.

However, with the above configuration of the motor drive circuit, it is necessary to employ the semiconductor element for performing the half-wave drive process, thus increasing the size of the motor drive circuit. Moreover, during the half-wave drive process, the high-side switches are kept off; that is, the high-side switches become redundant.

SUMMARY

The present invention has been made in view of the above circumstances. It is, therefore, a primary object of the present invention to provide a rotating electric machine system having a configuration with which it is possible to efficiently utilize components of the system and minimize the size of the system.

According to exemplary embodiments, there is provided a rotating electric machine system that includes a rotating electric machine and an electric power conversion circuit between which electric power is transferred. The rotating electric machine includes a stator core, and N coils wound on the stator core and respectively belonging to N phases, where N is an integer greater than or equal to 2. The coils are electrically connected with each other to define a neutral point therebetween. The electric power conversion circuit includes N high-side switches, N low-side switches, a selector switch, a full-wave driver, a half-wave driver and a drive controller. The N high-side switches respectively correspond to the N coils and each have a high potential-side terminal and a low potential-side terminal. All the high potential-side terminals of the high-side switches are electrically connected to a positive terminal of a DC power source. The N low-side switches respectively correspond to the N coils and each have a high potential-side terminal and a low potential-side terminal. All the low potential-side terminals of the low-side switches are electrically connected to a negative terminal of the DC power source. The high-side switches are either configured as permanently-connected switches with the low-side switches configured as selectively-connected switches or configured as selectively-connected switches with the low-side switches configured as permanently-connected switches. Each of the permanently-connected switches is permanently electrically connected with a corresponding one of the coils of the rotating electric machine. Each of the selectively-connected switches is selectively electrically connected with either a corresponding one of the permanently-connected switches or the neutral point between the coils. For each of the permanently-connected switches, that one of the high potential-side and low potential-side terminals of the permanently-connected switch which is electrically connected with neither the positive terminal nor the negative terminal of the DC power source constitutes a permanently-connected terminal. Each of the permanently-connected terminals of the permanently-connected switches is permanently electrically connected with a corresponding one of non-neutral point-side ends of the coils of the rotating electric machine. For each of the selectively-connected switches, that one of the high potential-side and low potential-side terminals of the selectively-connected switch which is electrically connected with neither the positive terminal nor the negative terminal of the DC power source constitutes a selectively-connected terminal. The selector switch selectively electrically connects each of the selectively-connected terminals of the selectively-connected switches to either a corresponding one of the permanently-connected terminals of the permanently-connected switches or the neutral point between the coils. The full-wave driver is configured to perform a full-wave drive process for full-wave driving the rotating electric machine. In the full-wave drive process, the full-wave driver controls on-off switching of the permanently-connected switches and the selectively-connected switches with the selectively-connected terminals of the selectively-connected switches electrically connected with the corresponding permanently-connected terminals of the permanently-connected switches by the selector switch. The half-wave driver is configured to perform a half-wave drive process for half-wave driving the rotating electric machine. In the half-wave drive process, the half-wave driver controls the on-off switching of the permanently-connected switches with the selectively-connected terminals of the selectively-connected switches electrically connected with the neutral point by the selector switch and with the selectively-connected switches kept on. The drive controller is configured to control both the full-wave driver and the half-wave driver to selectively cause either the full-wave driver to perform the full-wave drive process or the half-wave driver to perform the half-wave drive process.

With the above configuration, it becomes possible to perform the half-wave drive process as well as the full-wave drive process without employing a semiconductor element as disclosed in Japanese Patent Application Publication No. JPH11332288A; in the patent document, the semiconductor element is electrically connected between the high-side switches and the neutral point.

Moreover, with the above configuration, during the half-wave drive process, all of the high-side switches and the low-side switches are used. That is, there is no redundant switch in the rotating electric machine system. Consequently, it becomes possible to effectively utilize all of the switches constituting the electric power conversion circuit, thereby minimizing the size of the rotating electric machine system.

Furthermore, with the above configuration, during the half-wave drive process, the electric current from the DC power source is distributed to the N selectively-connected switches. Consequently, it becomes possible to prevent concentration of load on any of the selectively-connected switches, thereby effectively dissipating heat generated by these switches. As a result, it becomes possible to improve the reliability of the rotating electric machine system.

In comparison, in the motor drive circuit disclosed in Japanese Patent Application Publication No. JPH11332288A, all the phase currents merge at the semiconductor element that is electrically connected with the neutral point. Therefore, to ensure the reliability of the motor drive circuit, it is necessary to set the rated current of the semiconductor element to be N times (e.g., 3 times in the case of the number of phases N being equal to 3) the rated current of the high-side and low-side switches. Consequently, the size and manufacturing cost of the semiconductor element would be increased.

According to a first exemplary embodiment, in the half-wave drive process, the half-wave driver cyclically energizes the permanently-connected switches so that start timings of energization of the permanently-connected switches are offset from each other and each of the permanently-connected switches is energized for half or less of each cycle. More particularly, the start timings of energization of the permanently-connected switches are offset from each other by 360°/N in electrical angle.

The electric power conversion circuit further includes a selector switch controller. The selector switch controller controls the selector switch to perform, for each of the N coils, the switching between electrically connecting the selectively-connected terminal of the corresponding selectively-connected switch to the permanently-connected terminal of the corresponding permanently-connected switch and electrically connecting the selectively-connected terminal of the corresponding selectively-connected switch to the neutral point only when the absolute value of electric current flowing in the coil is less than or equal to a threshold current value.

For each of the N coils, during the switching between electrically connecting the selectively-connected terminal of the corresponding selectively-connected switch to the permanently-connected terminal of the corresponding permanently-connected switch and electrically connecting the selectively-connected terminal of the corresponding selectively-connected switch to the neutral point, a loop circuit which includes the DC power source and the coil is temporarily opened, generating a surge voltage. The greater the absolute value of the electric current flowing in the coil when the loop circuit is opened, the higher the generated surge voltage. Moreover, the electric current flowing in the coil is alternating current; therefore, there exist zero-crossing points in the electric current and the absolute value of the electric current is small in the vicinities of the zero-crossing points. Hence, by performing the switching only when the absolute value of the electric current is less than or equal to the threshold current value, it is possible to suppress the surge voltage generated during the switching.

The rotating electric machine further includes a rotor having a plurality of magnetic poles. The electric power conversion circuit further includes an acquiring unit that acquires magnetic pole position information on a magnetic pole position of the rotor. The selector switch controller determines, for each of the N coils, whether the absolute value of the electric current flowing in the coil is less than or equal to the threshold current value based on the magnetic pole position information acquired by the acquiring unit.

The electrical phase of the electric current flowing in the coil is related to the magnetic pole position of the rotor. Therefore, it is possible for the selector switch controller to determine whether the absolute value of the electric current is less than or equal to the threshold current value based on the magnetic pole position information.

The selector switch includes N pairs of first and second connection switches which respectively correspond to the N coils. For each of the N coils, the first connection switch is configured to electrically connect the selectively-connected terminal of the corresponding selectively-connected switch to the permanently-connected terminal of the corresponding permanently-connected switch; the second connection switch is configured to electrically connect the selectively-connected terminal of the corresponding selectively-connected switch to the neutral point. The selector switch controller performs first and second switching processes for each of the N coils. In the first switching process, the selector switch controller turns the corresponding first connection switch from on to off and the corresponding second connection switch from off to on. In the second switching process, the selector switch controller turns the corresponding first connection switch from off to on and the corresponding second connection switch from on to off. In each of the first and second switching processes, there is provided a time period for which both the corresponding first and second connection switches are kept on by the selector switch controller.

During the first and second switching processes, if there was a time period for which both the corresponding first and second connection switches are in an off state, an electric current flow path which includes the coil would be cut off and thus a surge voltage might be generated. However, by providing in each of the first and second switching processes a time period for which both the corresponding first and second connection switches are kept on, it is possible to prevent the electric current flow path from being cut off, thereby suppressing the generation of a surge voltage.

According to a second exemplary embodiment, the coils are first coils, the neutral point between the coils is a first neutral point, the high-side switches are first high-side switches, the low-side switches are first low-side switches and the selector switch is a first selector switch. The permanently-connected switches are respectively configured with the first high-side switches. The selectively-connected switches are respectively configured with the first low-side switches. The permanently-connected terminals are respectively constituted of the low potential-side terminals of the first high-side switches. The selectively-connected terminals are respectively constituted of the high potential-side terminals of the first low-side switches. The rotating electric machine further includes N second coils wound on the stator core so as to be electrically insulated from the first coils and respectively belonging to N phases that are different from the N phases of the first coils. The second coils are electrically connected with each other to define a second neutral point therebetween. The electric power conversion circuit further includes N second high-side switches, N second low-side switches and a second selector switch. The N second high-side switches respectively correspond to the N second coils and each have a high potential-side terminal and a low potential-side terminal. All the high potential-side terminals of the second high-side switches being electrically connected to the positive terminal of the DC power source. The N second low-side switches respectively correspond to the N second coils and each have a high potential-side terminal and a low potential-side terminal. All the low potential-side terminals of the second low-side switches are electrically connected to the negative terminal of the DC power source. Each of the high potential-side terminals of the second low-side switches is permanently electrically connected with a corresponding one of non-second neutral point-side ends of the second coils of the rotating electric machine. The second selector switch selectively electrically connects each of the low potential-side terminals of the second high-side switches to either a corresponding one of the high potential-side terminals of the second low-side switches or the second neutral point between the second coils. In the full-wave drive process, the full-wave driver controls on-off switching of the first high-side switches, the first low-side switches, the second high-side switches and the second low-side switches with the high potential-side terminals of the first low-side switches electrically connected with the corresponding low potential-side terminals of the first high-side switches by the first selector switch and the low potential-side terminals of the second high-side switches electrically connected with the corresponding high potential-side terminals of the second low-side switches by the second selector switch. In the half-wave drive process, the half-wave driver controls the on-off switching of the first high-side switches and the second low-side switches with the high potential-side terminals of the first low-side switches electrically connected with the first neutral point by the first selector switch and the low potential-side terminals of the second high-side switches electrically connected with the second neutral point by the second selector switch and with the first low-side switches and the second high-side switches kept on.

With the above configuration, during the half-wave drive process, in each of the first coils, electric current flows in the direction from the corresponding first high-side switch to the first neutral point. On the other hand, in each of the second coils, electric current flows in the direction from the second neutral point to the corresponding second low-side switch. That is, the directions of the electric currents flowing in the first coils with respect to the first neutral point are opposite to the directions of the electric currents flowing in the second coils with respect to the second neutral point. Consequently, it becomes possible to reduce the maximum instantaneous torque while increasing the minimum instantaneous torque of the rotating electric machine. As a result, it becomes possible to reduce the torque ripple of the rotating electric machine.

The rotating electric machine system further includes a positive conductor electrically connected with the positive terminal of the DC power source, a negative conductor electrically connected with the negative terminal of the DC power source, and a capacitor electrically connected between the positive and negative conductors. Each of the high potential-side terminals of the first and second high-side switches is electrically connected with the positive conductor. Each of the low potential-side terminals of the first and second low-side switches is electrically connected with the negative conductor.

With the above configuration, during the half-wave drive process, the electric current ripples generated in the positive and negative conductors due to the on-off switching of the first high-side switches can be canceled by the electric current ripples generated in the positive and negative conductors due to the on-off switching of the second low-side switches. Consequently, it becomes possible to reduce the total electric current ripples generated in the positive and negative conductors, thereby making it possible to lower the capacitance of the capacitor. As a result, it becomes possible to minimize the size of the capacitor.

Moreover, in the half-wave drive process, the half-wave driver cyclically energizes the first high-side switches so that start timings of energization of the first high-side switches are offset from each other and each of the first high-side switches is energized for a first predetermined period in each cycle; the first predetermined period is shorter than or equal to half of each cycle. The half-wave driver also cyclically energizes the second low-side switches so that start timings of energization of the second low-side switches are offset from each other and each of the second low-side switches is energized for a second predetermined period in each cycle; the second predetermined period is shorter than or equal to half of each cycle. More particularly, the start timings of energization of the first high-side switches are offset from each other by 360°/N in electrical angle; the start timings of energization of the second low-side switches are also offset from each other by 360°/N in electrical angle.

Furthermore, each of the first and second predetermined periods is set to be longer than or equal to (90°+180°/N) and shorter than or equal to 180° in electrical angle.

If the energization periods of the first and second coils were short, the torque ripple of the rotating electric machine would be increased. However, setting the first and second predetermined periods according to the number of phases N as above, sufficiently long energization periods of the first and second coils can be secured, thereby effectively suppressing the torque ripple of the rotating electric machine.

The first coils and the second coils are wound on the stator core so that each of the first coils has the same spatial phase as a corresponding one of the second coils. In the half-wave drive process, the half-wave driver cyclically energizes the first high-side switches and the second low-side switches so that for each same-spatial phase pair of the first and second coils, the start timing of energization of one of the first high-side switches which corresponds to the first coil of the same-spatial phase pair and the start timing of energization of one of the second low-side switches which corresponds to the second coil of the same-spatial phase pair are offset from each other by 180° in electrical angle.

With the above configuration, for each same-spatial phase pair of the first and second coils, the first coil is energized during the deenergization periods of the second coil and the second coil is energized during the deenergization periods of the first coil. Consequently, it becomes possible to raise the minimum value of the cyclically-changing torque of the rotating electric machine, thereby increasing the average torque of the rotating electric machine.

In addition, in the case where each of the first and second predetermined periods is set to be equal to 180° in electrical angle, for each same-spatial phase pair of the first and second coils, the end timing of energization of the corresponding first high-side switch coincides with the start timing of energization of the corresponding second low-side switch.

The electric power conversion circuit further includes first and second selector switch controllers. The first selector switch controller controls the first selector switch to perform, for each of the N first coils, the switching between electrically connecting the high potential-side terminal of the corresponding first low-side switch to the low potential-side terminal of the corresponding first high-side switch and electrically connecting the high potential-side terminal of the corresponding first low-side switch to the first neutral point only when the absolute value of electric current flowing in the first coil is less than or equal to a first threshold current value. The second selector switch controller controls the second selector switch to perform, for each of the N second coils, the switching between electrically connecting the low potential-side terminal of the corresponding second high-side switch to the high potential-side terminal of the corresponding second low-side switch and electrically connecting the low potential-side terminal of the corresponding second high-side switch to the second neutral point only when the absolute value of electric current flowing in the second coil is less than or equal to a second threshold current value.

With the above configuration, it becomes possible to suppress the surge voltages generated during the switching by the first and second selector switches, thereby improving the reliability of the rotating electric machine system.

The first selector switch comprises N pairs of first and second connection switches which respectively correspond to the N first coils. For each of the N first coils, the first connection switch is configured to electrically connect the high potential-side terminal of the corresponding first low-side switch to the low potential-side terminal of the corresponding first high-side switch and the second connection switch is configured to electrically connect the high potential-side terminal of the corresponding first low-side switch to the first neutral point. The second selector switch comprises N pairs of third and fourth connection switches which respectively correspond to the N second coils. For each of the N second coils, the third connection switch is configured to electrically connect the low potential-side terminal of the corresponding second high-side switch to the high potential-side terminal of the corresponding second low-side switch and the fourth connection switch is configured to electrically connect the low potential-side terminal of the corresponding second high-side switch to the second neutral point. The electric power conversion circuit further includes a first selector switch controller that controls the first selector switch and a second selector switch controller that controls the second selector switch. The first selector switch controller performs first and second switching processes for each of the N first coils. In the first switching process, the first selector switch controller turns the corresponding first connection switch from on to off and the corresponding second connection switch from off to on. In the second switching process, the first selector switch controller turns the corresponding first connection switch from off to on and the corresponding second connection switch from on to off. In each of the first and second switching processes, there is a time period for which both the corresponding first and second connection switches are kept on by the first selector switch controller. The second selector switch controller performs third and fourth switching processes for each of the N second coils. In the third switching process, the second selector switch controller turns the corresponding third connection switch from on to off and the corresponding fourth connection switch from off to on. In the fourth switching process, the second selector switch controller turns the corresponding third connection switch from off to on and the corresponding fourth connection switch from on to off. In each of the third and fourth switching processes, there is a time period for which both the corresponding third and fourth connection switches are kept on by the second selector switch controller.

With the above configuration, it becomes possible to prevent electric current flow paths in the rotating electric machine from being cut off during the first to the fourth switching processes, thereby suppressing the generation of a surge voltage in the rotating electric machine.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
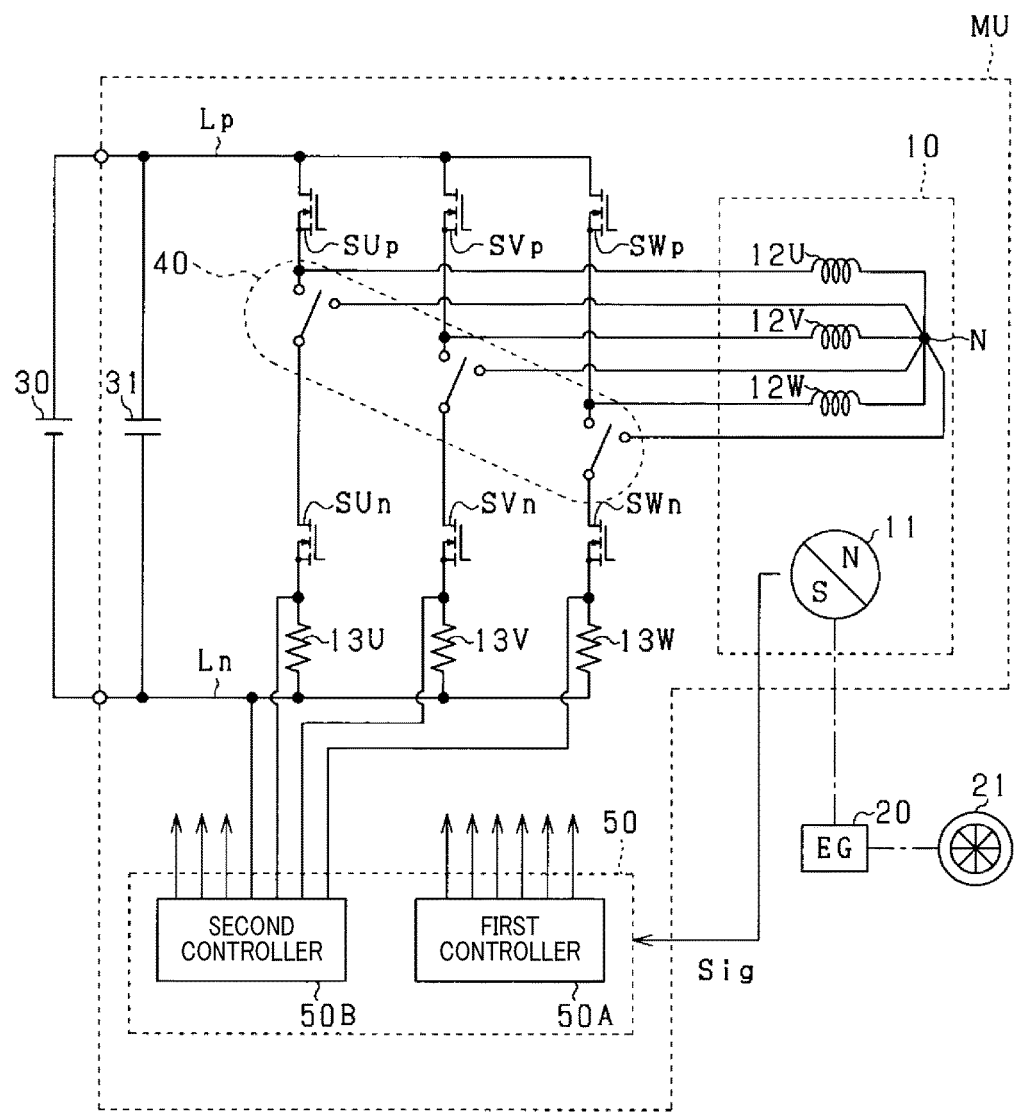
FIG. 1 is a schematic view illustrating the overall configuration of an in-vehicle rotating electric machine system according to a first embodiment.

Exemplary embodiments will be described hereinafter with reference to FIGS. 1-17. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine system MU according to a first embodiment.

In the present embodiment, the rotating electric machine system MU is installed in a motor vehicle which includes an engine 20.

As shown in FIG. 1, the rotating electric machine system MU includes a rotating electric machine 10. In the present embodiment, the rotating electric machine 10 is configured as a permanent magnet-type synchronous machine. More particularly, the rotating electric machine 10 is implemented by an ISG (Integrated Starter Generator) that can selectively function either as an electric motor or an electric generator.

The rotating electric machine 10 includes a rotor 11 that is mechanically connected with an output shaft of the engine 20 to provide/receive mechanical power to/from the output shaft. More particularly, in the present embodiment, the rotor 11 is mechanically connected with the output shaft of the engine 20 via a belt (not shown). Moreover, to the output shaft of the engine 20, there are mechanically connected driving wheels 21 of the vehicle via a power transmission path which includes a transmission (not shown) and an axle (not shown) of the vehicle.

Moreover, the rotor 11 includes a plurality of permanent magnets that form a plurality of magnetic poles; the polarities of the magnetic poles alternate between N (North) and S (South) in a circumferential direction of the rotor 11. In addition, it should be noted that for the sake of simplicity, only one pair of N and S poles are depicted in FIG. 1.

The rotating electric machine 10 further includes a stator core (not shown) on which a three-phase stator coil is wound. The three-phase stator coil is comprised of a U-phase coil 12U, a V-phase coil 12V and a W-phase coil 12W. The U-phase, V-phase and W-phase coils 12U, 12V and 12W are star-connected (or Y-connected) to define a neutral point N therebetween. Moreover, the U-phase, V-phase and W-phase coils 12U, 12V and 12W are wound on the stator core in such a manner as to be offset from each other by 120° in electrical angle.

Figure 2:
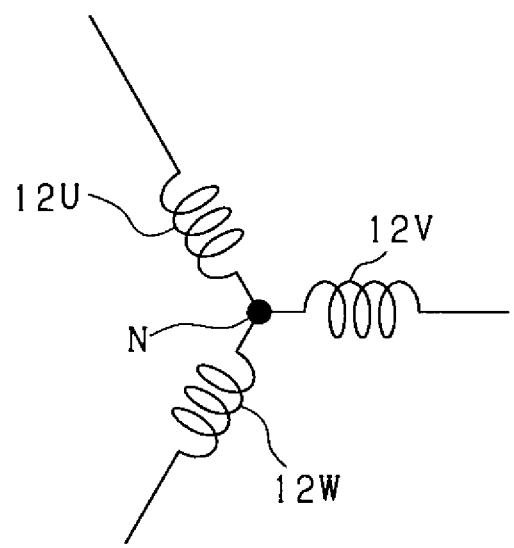
FIG. 2 is an electrical connection diagram of a three-phase stator coil of a rotating electric machine included in the system according to the first embodiment.
Figure 3:
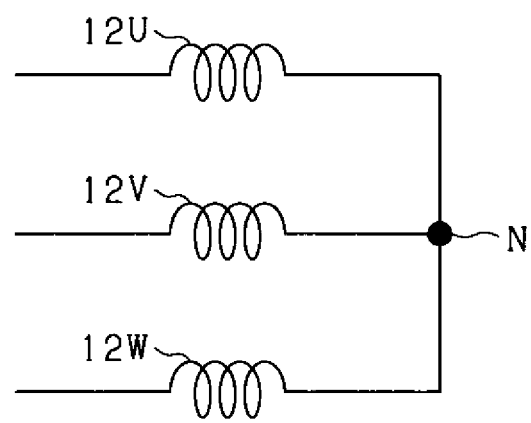
FIG. 3 is a schematic representation of the three-phase stator coil shown in FIG. 2.

In addition, in FIG. 2, the U-phase, V-phase and W-phase coils 12U, 12V and 12W are depicted to represent the phase offset of 120° in electrical angle therebetween. On the other hand, in FIG. 1, for the sake of convenience, the U-phase, V-phase and W-phase coils 12U, 12V and 12W are depicted as shown through magnification in FIG. 3.

Referring back to FIG. 1, the rotating electric machine system MU includes a pair of a U-phase high-side switch SUp and a U-phase low-side switch SUn, a pair of a V-phase high-side switch SVp and a V-phase low-side switch SVn, and a pair of a W-phase high-side switch SWp and a W-phase low-side switch SWn. Moreover, high potential-side terminals of the U-phase, V-phase and W-phase high-side switches SUp, SVp and SWp are electrically connected to a positive terminal of a DC power source 30 via a positive conductor Lp such as a busbar. On the other hand, low potential-side terminals of the U-phase, V-phase and W-phase low-side switches SUn, SVn and SWn are electrically connected to a negative terminal of the DC power source 30 via respective shunt resistors 13U, 13V and 13W and a negative conductor Ln such as a busbar.

The rotating electric machine system MU also includes a capacitor 31. The capacitor 31 has its high potential-side terminal electrically connected with the positive conductor Lp and its low potential-side terminal electrically connected with the negative conductor Ln.

In the present embodiment, each of the U-phase, V-phase and W-phase high-side switches SUp, SVp and SWp and the U-phase, V-phase and W-phase low-side switches SUn, SVn and SWn is implemented by a voltage control-type semiconductor switching element, more particularly by an N-channel MOSFET (Metal-Oxide-Semiconductor Field-Effect Transistor). Accordingly, for each of the switches SUp-SWp and SUn-SWn, the high potential-side terminal is the drain and the low potential-side terminal is the source. In addition, each of the switches SUp-SWp and SUn-SWn has a body diode (not shown) connected in antiparallel (or inverse parallel) thereto.

The negative conductor Ln is electrically connected with the ground. In the present embodiment, the DC power source 30 is implemented by a battery. Moreover, the rated voltage of the DC power source 30 is equal to, for example, 12V.

First ends of the U-phase, V-phase and W-phase coils 12U, 12V and 12W are respectively electrically connected with the sources of the U-phase, V-phase and W-phase high-side switches SUp, SVp and SWp via an electric conductor such as a busbar. On the other hand, second ends of the U-phase, V-phase and W-phase coils 12U, 12V and 12W are electrically connected with each other at the neutral point N.

In addition, in the present embodiment, each of the U-phase, V-phase and W-phase high-side switches SUp, SVp and SWp is configured as a "permanently-connected switch" which is permanently (or always) electrically connected between the positive terminal of the DC power source 30 and a corresponding one of the U-phase, V-phase and W-phase coils 12U, 12V and 12W. Moreover, each of the sources (or low potential-side terminals) of the U-phase, V-phase and W-phase high-side switches SUp, SVp and SWp constitutes a "permanently-connected terminal" which is permanently electrically connected with a corresponding one of the first ends (or non-neutral point-side ends) of the U-phase, V-phase and W-phase coils 12U, 12V and 12W.

The rotating electric machine system MU further includes a selector switch 40. The selector switch 40 selectively electrically connects each of the drains of the U-phase, V-phase and W-phase low-side switches SUn, SVn and SWn to either a corresponding one of the sources of the U-phase, V-phase and W-phase high-side switches SUp, SVp and SWp or the neutral point N between the U-phase, V-phase and W-phase coils 12U, 12V and 12W.

In addition, in the present embodiment, each of the U-phase, V-phase and W-phase low-side switches SUn, SVn and SWn is configured as a "selectively-connected switch" which is selectively electrically connected with either a corresponding one of the U-phase, V-phase and W-phase high-side switches SUp, SVp and SWp or the neutral point N. Moreover, each of the drains (or high potential-side terminals) of the U-phase, V-phase and W-phase low-side switches SUn, SVn and SWn constitutes a "selectively-connected terminal" which is selectively electrically connected with either a corresponding one of the sources of the U-phase, V-phase and W-phase high-side switches SUp, SVp and SWp or the neutral point N.

Figure 4:
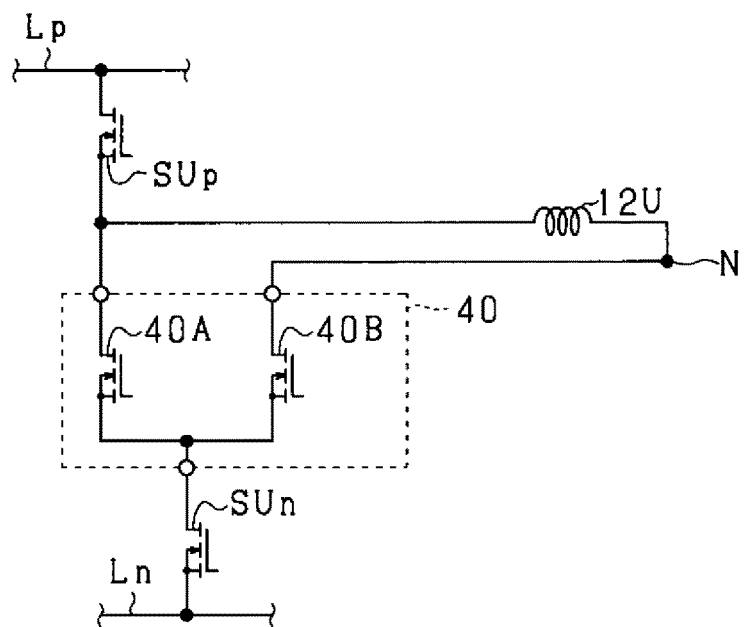
FIG. 4 is a circuit diagram of a U-phase part of a selector switch included in the system according to the first embodiment.

FIG. 4 illustrates the configuration of the selector switch 40 according to the present embodiment. The selector switch 40 includes a U-phase part, a V-phase part and a W-phase part which respectively correspond to the U, V and W phases. The U-phase, V-phase and W-phase parts of the selector switch 40 are identical in configuration. Therefore, for the sake of simplicity, only the U-phase part of the selector switch 40 is shown in FIG. 4. In addition, the U-phase shunt resistor 13U is omitted from FIG. 4 also for the sake of simplicity.

As shown in FIG. 4, the U-phase part of the selector switch 40 includes a first connection switch 40A and a second connection switch 40B. In the present embodiment, each of the first and second connection switches 40A and 40B is implemented by an N-channel MOSFET. The first connection switch 40A has its drain electrically connected with the source of the U-phase high-side switch SUp and its source electrically connected with the drain of the U-phase low-side switch SUn. On the other hand, the second connection switch 40B has its drain electrically connected with the neutral point N via an electric conductor, such as a busbar, and its source electrically connected with the drain of the U-phase low-side switch SUn.

Referring again to FIG. 1, the rotating electric machine system MU further includes a control apparatus 50. To the control apparatus 50, there is inputted magnetic pole position information Sig of the rotor 11. The control apparatus 50 includes a first controller 50A and a second controller 50B.

To the second controller 50B, there are inputted electric potential differences across the U-phase, V-phase and W-phase shunt resistors 13U, 13V and 13W. The second controller 50B functions as a "selector switch controller" to control the selector switch 40.

Specifically, referring again to FIG. 4, the second controller 50B performs a first switching process in which the first connection switch 40A is turned off and the second connection switch 40B is turned on, thereby electrically connecting the drain of the U-phase low-side switch SUn to the neutral point N. Moreover, the second controller 50B also performs a second switching process in which the first connection switch 40A is turned on and the second connection switch 40B is turned off, thereby electrically connecting the drain of the U-phase low-side switch SUn to the source of the U-phase high-side switch SUp.

In addition, as the magnetic pole position information Sig, electrical angle information may be used which is obtained by an electrical angle sensor that senses the electrical angle of the rotor 11. In this case, the electrical angle sensor may be implemented by, for example, a resolver, a Hall IC (Integrated Circuit), an MR (magnetoresistive) sensor or an optical sensor. Alternatively, as the magnetic pole position information Sig, electrical angle information may be used which is obtained by a position sensor-less control without using an electrical angle sensor.

It should be noted that the components of the rotating electric machine system MU, which include the rotating electric machine 10, the switches SUp-SWp and SUn-SWn, the selector switch 40 and the control apparatus 50, may be configured integrally with or separately from each other.

The first controller 50A controls the on-off switching of the switches SUp-SWp and SUn-SWn on the basis of the magnetic pole position information Sig of the rotor 11, thereby driving the rotating electric machine 10 to function as an electric motor. In addition, in the present embodiment, the first controller 50A functions as a "half-wave driver", a "full-wave driver" and a "drive controller".

Specifically, the first controller 50A first calculates the rotational speed Nm of the rotor 11 on the basis of the magnetic pole position information Sig. Then, the first controller 50A determines whether the calculated rotational speed Nm is higher than a first predetermined speed Nth1.

Figure 5:
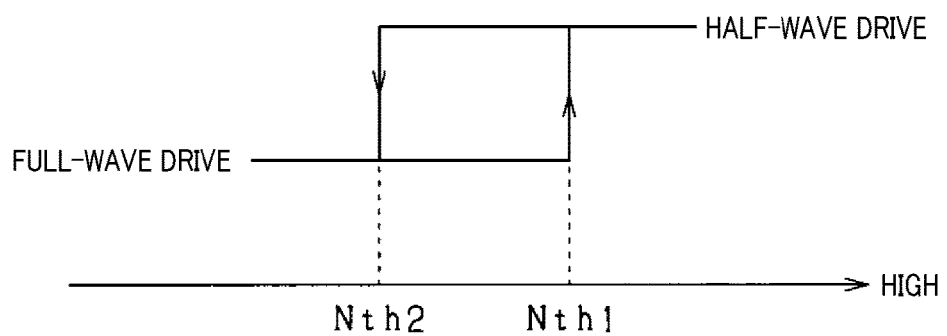
FIG. 5 is a schematic view illustrating the switching between a full-wave drive process and a half-wave drive process according to the first embodiment.

Referring to FIG. 5, when the calculated rotational speed Nm of the rotor 11 is determined to be not higher than (i.e., lower than or equal to) the first predetermined speed Nth1, the first controller 50A performs a full-wave drive process for full-wave driving the rotating electric machine 10.

In the full-wave drive process, with the selector switch 40 controlled by the second controller 50B to electrically connect the drains of the U-phase, V-phase and W-phase low-side switches SUn, SVn and SWn respectively to the sources of the U-phase, V-phase and W-phase high-side switches SUp, SVp and SWp, the first controller 50A controls the on-off switching of the switches SUp-SWp and SUn-SWn so that the U-phase, V-phase and W-phase high-side switches SUp, SVp and SWp are alternately turned on respectively with the U-phase, V-phase and W-phase low-side switches SUn, SVn and SWn. Consequently, three-phase symmetrical alternating current is supplied from the junction points between the U-phase, V-phase and W-phase high-side switches SUp, SVp and SWp and the U-phase, V-phase and W-phase low-side switches SUn, SVn and SWn to the U-phase, V-phase and W-phase coils 12U, 12V and 12W. In addition, a well-known method, such as a vector control method, may be used to supply the three-phase symmetrical alternating current.

On the other hand, when the calculated rotational speed Nm of the rotor 11 is determined to be higher than the first predetermined speed Nth1, the first controller 50A performs a half-wave drive process for half-wave driving the rotating electric machine 10.

Figure 6:
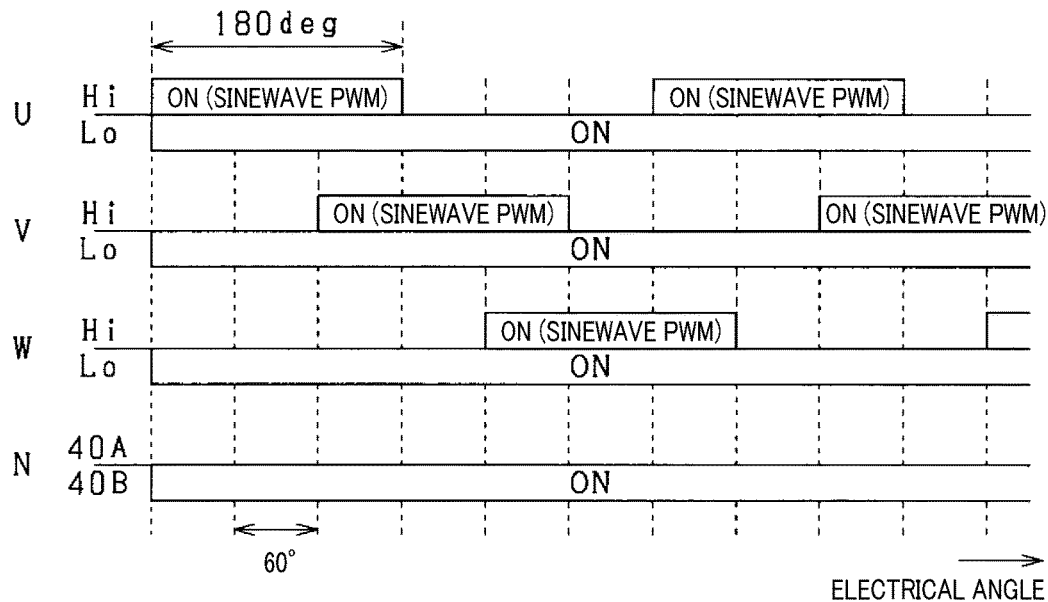
FIG. 6 is a schematic view illustrating an energization pattern of U-phase, V-phase and W-phase high-side switches in the half-wave drive process according to the first embodiment.

In the half-wave drive process, with the selector switch 40 controlled by the second controller 50B to electrically connect all the drains of the U-phase, V-phase and W-phase low-side switches SUn, SVn and SWn to the neutral point N, the first controller 50A controls the on-off switching of the U-phase, V-phase and W-phase high-side switches SUp, SVp and SWp according to an energization pattern as shown in FIG. 6 while keeping all the U-phase, V-phase and W-phase low-side switches SUn, SVn and SWn in an on state.

In addition, during the half-wave drive process, since the U-phase, V-phase and W-phase low-side switches SUn, SVn and SWn are kept in the on state, no switching loss occurs in these switches SUn, SVn and SWn.

Moreover, in the present embodiment, referring again to FIG. 5, when the calculated rotational speed Nm of the rotor 11 is determined to be lower than a second predetermined speed Nth2, which is lower than the first predetermined speed Nth1, after being determined once to be higher than the first predetermined speed Nth1, the first controller 50A switches the drive process for the rotating electric machine 10 from the half-wave drive process to the full-wave drive process. Consequently, it is possible to prevent frequent switching from occurring between the half-wave drive process and the full-wave drive process.

Figure 7:
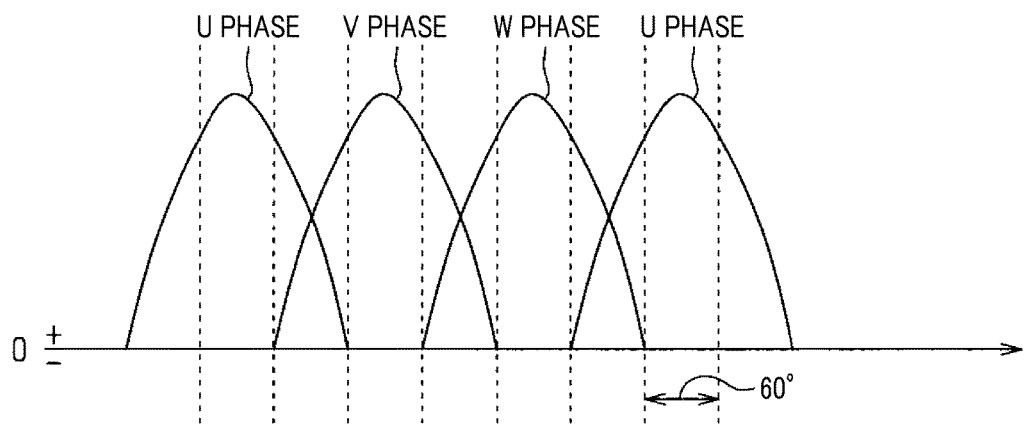
FIG. 7 is a waveform chart illustrating the waveforms of phase currents flowing in the three-phase stator coil during the half-wave drive process according to the first embodiment.

Next, the half-wave drive process according to the present embodiment will be descried in more detail with reference to FIGS. 6 and 7, where each division on the horizontal axis represents 60° in electrical angle.

As shown in FIG. 6, in the present embodiment, the first controller 50A offsets the start timings of energization of the U-phase, V-phase and W-phase high-side switches SUp, SVp and SWp from each other by 120° in electrical angle. Moreover, the first controller 50A cyclically energizes each of the U-phase, V-phase and W-phase high-side switches SUp, SVp and SWp at intervals of 180° in electrical angle. Hence, for each of the U-phase, V-phase and W-phase high-side switches SUp, SVp and SWp, there exist deenergization periods of 180° in electrical angle. Furthermore, the energization periods of the U-phase, V-phase and W-phase high-side switches SUp, SVp and SWp overlap each other by 60° in electrical angle.

In the present embodiment, the energization control of the U-phase, V-phase and W-phase high-side switches SUp, SVp and SWp is carried out by a sinewave PWM control. Consequently, as shown in FIG. 7, the waveforms of the U-phase, V-phase and W-phase currents flowing respectively in the U-phase, V-phase and W-phase coils 12U, 12V and 12W have the shape of a half sine wave. More specifically, in each of the U-phase, V-phase and W-phase coils 12U, 12V and 12W, the phase current flows for only half of each sinusoidal cycle (i.e., 360°/2=180° in electrical angle).

In addition, in FIG. 7, the directions of the U-phase, V-phase and W-phase currents are defined to be positive when these currents flow respectively from the first ends of the U-phase, V-phase and W-phase coils 12U, 12V and 12W to the neutral point N and be negative in the opposite directions.

As described above, in the present embodiment, with the selector switch 40, it is possible to perform the half-wave drive process as well as the full-wave drive process without employing a semiconductor element as disclosed in Japanese Patent Application Publication No. JPH11332288A; in the patent document, the semiconductor element is electrically connected between the high-side switches and the neutral point.

Moreover, in the present embodiment, during the half-wave drive process, all of the U-phase, V-phase and W-phase high-side switches SUp, SVp and SWp and the U-phase, V-phase and W-phase low-side switches SUn, SVn and SWn are used. That is, there is no redundant switch in the rotating electric machine system MU. Consequently, it becomes possible to effectively utilize all of the SUp-SWp and SUn-SWn constituting the electric power conversion circuit, thereby minimizing the size of the rotating electric machine system MU.

Furthermore, in the present embodiment, during the half-wave drive process, the electric current from the DC power source 30 is distributed to the U-phase, V-phase and W-phase low-side switches SUn, SVn and SWn. Consequently, it becomes possible to prevent concentration of load on any of the U-phase, V-phase and W-phase low-side switches SUn, SVn and SWn, thereby effectively dissipating heat generated by these switches. As a result, it becomes possible to improve the reliability of the rotating electric machine system MU.

In the present embodiment, the second controller 50B controls the selector switch 40 to perform, for each of the U-phase, V-phase and W-phase coils 12U, 12V and 12W, the switching between electrically connecting the drain of the corresponding low-side switch to the source of the corresponding high-side switch and electrically connecting the drain of the corresponding low-side switch to the neutral point N only when the absolute value of the phase current flowing in the phase coil is less than or equal to a threshold current value Ith. Consequently, it is possible to suppress the generation of a surge voltage during the first and second switching processes, thereby improving the reliability of the rotating electric machine system MU.

More specifically, for each of the U-phase, V-phase and W-phase coils 12U, 12V and 12W, during the first and second switching processes (or during the switching between electrically connecting the drain of the corresponding low-side switch to the source of the corresponding high-side switch and electrically connecting the drain of the corresponding low-side switch to the neutral point N), a loop circuit which includes the DC power source 30 and the phase coil is temporarily opened, generating a surge voltage. The greater the absolute value of the phase current when the loop circuit is opened, the higher the generated surge voltage. Moreover, the phase current flowing in the phase coil is alternating current; therefore, there exist zero-crossing points in the phase current and the absolute value of the phase current is small in the vicinities of the zero-crossing points. Hence, by performing the first and second switching processes only when the absolute value of the phase current is less than or equal to the threshold current value Ith, it is possible to suppress the surge voltage generated during the first and second switching processes.

Figure 8:
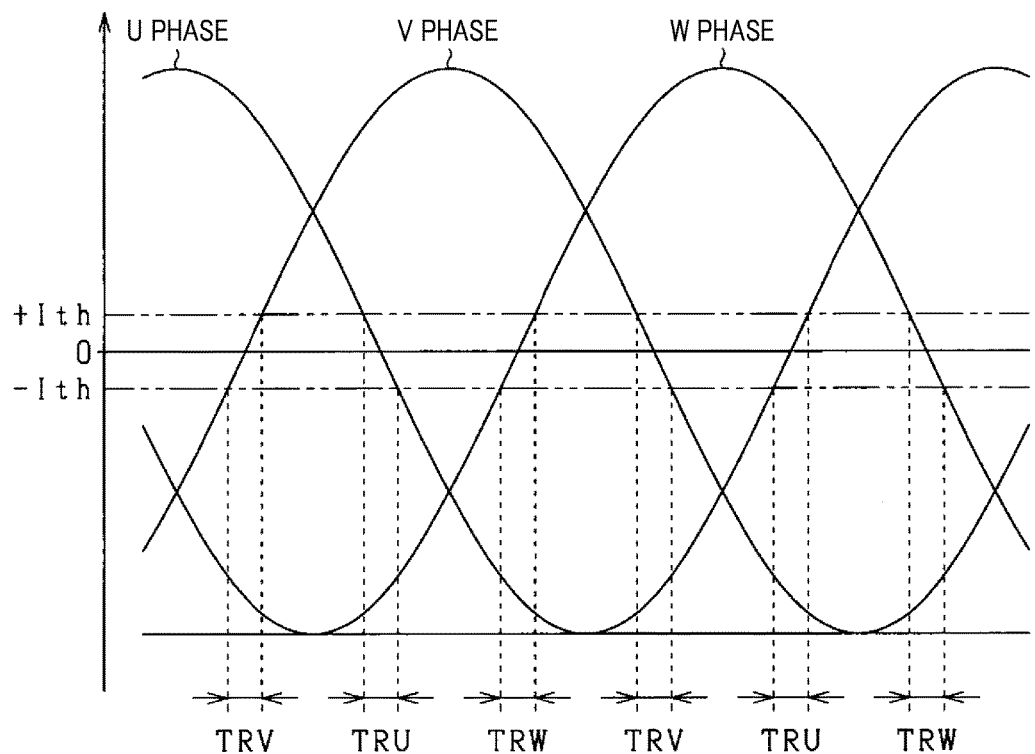
FIG. 8 is a waveform chart illustrating a switching timing of the selector switch according to the first embodiment.

FIG. 8 illustrates switching-allowed periods TRU, TRV and TRW. During the switching-allowed periods TRU, the absolute value of the U-phase current flowing in the U-phase coil 12U is less than or equal to the threshold current value Ith; thus, the selector switch 40 is allowed to perform the switching between electrically connecting the drain of the U-phase low-side switch SUn to the source of the U-phase high-side switch SUp and electrically connecting the drain of the U-phase low-side switch SUn to the neutral point N. Similarly, during the switching-allowed periods TRV, the absolute value of the V-phase current flowing in the V-phase coil 12V is less than or equal to the threshold current value Ith; thus, the selector switch 40 is allowed to perform the switching between electrically connecting the drain of the V-phase low-side switch SVn to the source of the V-phase high-side switch SVp and electrically connecting the drain of the V-phase low-side switch SVn to the neutral point N. During the switching-allowed periods TRW, the absolute value of the W-phase current flowing in the W-phase coil 12W is less than or equal to the threshold current value Ith; thus, the selector switch 40 is allowed to perform the switching between electrically connecting the drain of the W-phase low-side switch SWn to the source of the W-phase high-side switch SWp and electrically connecting the drain of the W-phase low-side switch SWn to the neutral point N.

In addition, the threshold current value Ith may be set in consideration of both suppression of surge voltages and facilitation of determination of the switching-allowed periods TRU, TRV and TRW. For example, the threshold current value Ith may be set to be about 10% of the rated current value for the U-phase, V-phase and W-phase currents flowing respectively in the U-phase, V-phase and W-phase coils 12U, 12V and 12W.

In the present embodiment, during the full-wave drive process, the first controller 50A calculates the absolute values of the U-phase, V-phase and W-phase currents based on the electric potential differences across the U-phase, V-phase and W-phase shunt resistors 13U, 13V and 13W and the energization pattern (or on-off switching pattern) of the U-phase, V-phase and W-phase high-side switches SUp, SVp and SWp and the U-phase, V-phase and W-phase low-side switches SUn, SVn and SWn. This calculation method is based on the fact that the voltage vectors, which are applied to the U-phase, V-phase and W-phase coils 12U, 12V and 12W according to the energization pattern of the switches SUp-SWp and SUn-SWn, are related to the U-phase, V-phase and W-phase currents detectable by the shunt resistors 13U, 13V and 13W. On the other hand, during the half-wave drive process, the first controller 50A calculates the absolute values of the U-phase, V-phase and W-phase currents based on the electric potential differences across the U-phase, V-phase and W-phase shunt resistors 13U, 13V and 13W. This calculation method is based on the fact that the electric current flowing to the neutral point N are divided into three parts which respectively flow through the U-phase, V-phase and W-phase low-side switches SUn, SVn and SWn.

Moreover, the rotating electric machine 10 may be configured as a field winding-type machine instead of the permanent magnet-type machine. In this case, during the first and second switching processes, to suppress the generation of a surge voltage, it may be possible to switch the drive states of the first and second connection switches 40A and 40B upon interrupting once the supply of exciting current (or field current) to the field winding. However, the time constant (e.g., several hundred milliseconds) of the exciting current supplied to the field winding is at least one order of magnitude longer than the control time constant of the switches SUp-SWp and SUn-SWn. Therefore, when the supply of the exciting current to the field winding is resumed after switching the drive states of the first and second connection switches 40A and 40B, it would take an excessively long time for the exciting current to reach a target value thereof. Consequently, with execution of the first and second switching processes, operation of the rotating electric machine 10 would be temporarily stopped. In contrast, if the first and second switching processes were performed only when the absolute value of the phase current is less than or equal to the threshold current value Ith, it would become unnecessary to interrupt the supply of the exciting current to the field winding for the purpose of suppressing the generation of a surge voltage. Consequently, it would become possible to prevent operation of the rotating electric machine 10 from being temporarily stopped.

In the present embodiment, the determination as to whether the absolute value of the phase current is less than or equal to the threshold current value Ith may alternatively be made based on the magnetic pole position information Sig. This determination method is based on the fact that the electrical phase of the phase current is related to the magnetic pole position of the rotor 11. More specifically, the second controller 50B may be modified to perform the first and second switching processes only when the magnetic pole position of the rotor 11 determined based on the magnetic pole position information Sig is within a range where the absolute value of the phase current is assumed to be less than or equal to the threshold current value Ith.

Figure 9:
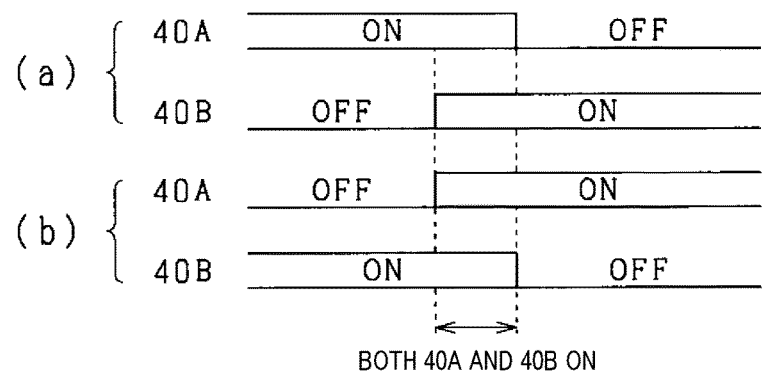
FIG. 9 is a schematic view illustrating first and second switching processes of the selector switch according to the first embodiment.

In the present embodiment, as shown in FIG. 9 (a), in the first switching process, the second controller 50B turns on the second connection switch 40B before turning off the first connection switch 40A. Consequently, in the first switching process, there is a time period for which both the first and second connection switches 40A and 40B are kept on by the second controller 50B. Moreover, as shown in FIG. 9(b), in the second switching process, the second controller 50B turns on the first connection switch 40A before turning off the second connection switch 40B. Consequently, in the second switching process, there is also a time period for which both the first and second connection switches 40A and 40B are kept on by the second controller 50B. Performing the first and second switching processes as above, it is possible to prevent an electric current flow path which includes the phase coil from being cut off due to the switching of the drive states of the first and second connection switches 40A and 40B, thereby suppressing the generation of a surge voltage.

Second Embodiment

A rotating electric machine system MU according to a second embodiment has a similar configuration to the rotating electric machine system MU according to the first embodiment. Accordingly, the differences therebetween will be mainly described hereinafter.

Figure 10:
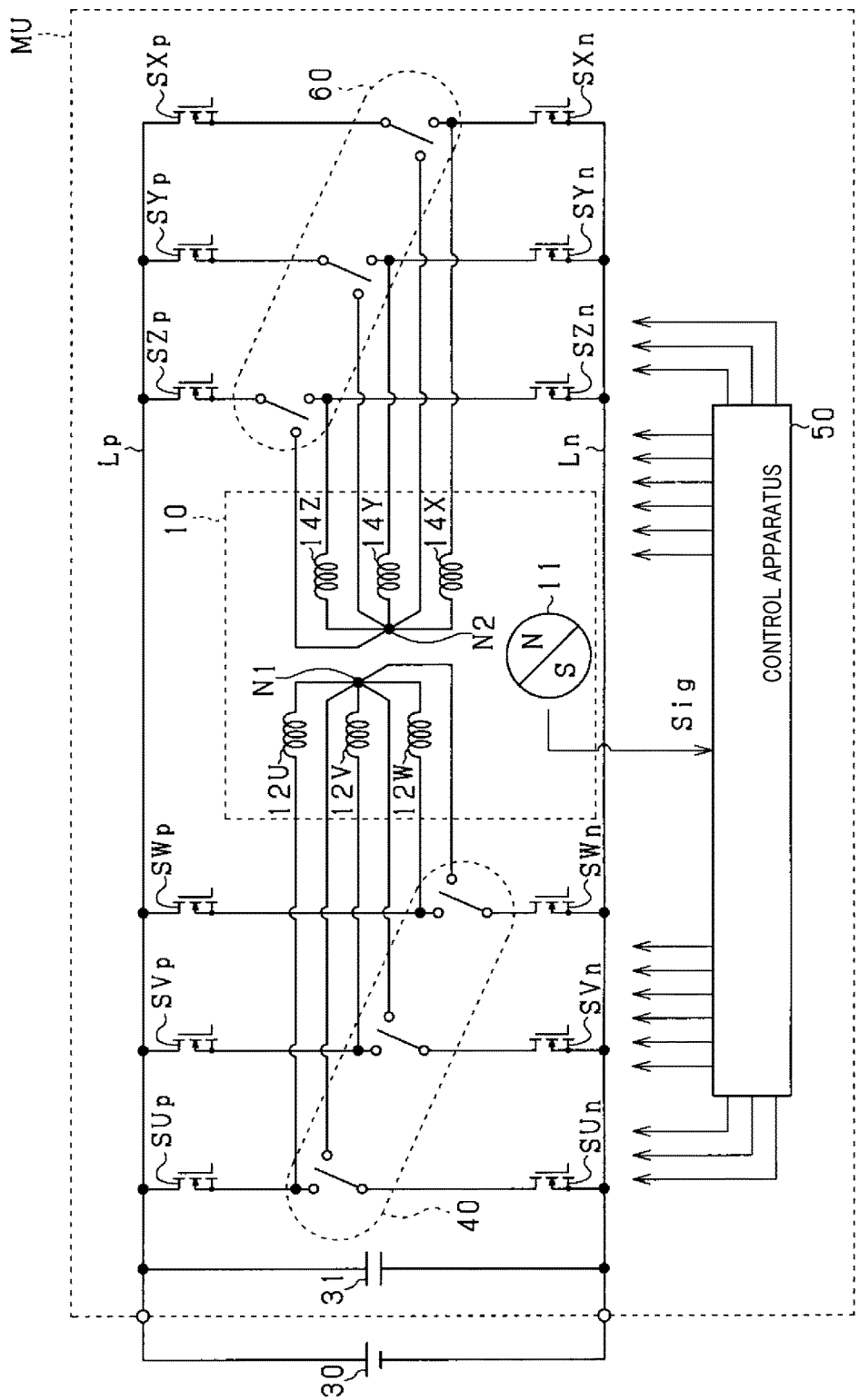
FIG. 10 is a schematic view illustrating the overall configuration of an in-vehicle rotating electric machine system according to a second embodiment.

FIG. 10 shows the overall configuration of the rotating electric machine system MU according to the present embodiment. It should be noted that for the sake of simplicity, the engine 20 and shunt resistors 13U, 13V and 13W are omitted from FIG. 10.

In the present embodiment, the selector switch 40 described in the first embodiment will be referred to as first selector switch 40. The neutral point N between the U-phase, V-phase and W-phase coils 12U, 12V and 12W will be referred to as first neutral point N1. All the functions performed by the first and second controllers 50A and 50B of the control apparatus 50 will be described as being performed by the control apparatus 50; and the first and second controllers 50A and 50B are not shown in the figures for the sake of simplicity.

As shown in FIG. 10, in the present embodiment, the rotating electric machine 10 includes two three-phase coils, i.e., a first three-phase stator coil comprised of the U-phase, V-phase and W-phase coils 12U, 12V and 12W described in the first embodiment and a second three-phase stator coil comprised of X-phase, Y-phase and W-phase coils 14X, 14Y and 14W.

The first and second three-phase stator coils are wound on the same stator core 15a (see FIG. 11) in such a manner that the U-phase, V-phase and W-phase coils 12U, 12V and 12W are electrically insulated from the X-phase, Y-phase and W-phase coils 14X, 14Y and 14W.

The X-phase, Y-phase and W-phase coils 14X, 14Y and 14W are star-connected to define a second neutral point N2 therebetween. Moreover, the X-phase, Y-phase and W-phase coils 14X, 14Y and 14W are wound on the stator core 15a in such a manner as to be offset from each other by 120° in electrical angle.

In addition, in the present embodiment, the number of turns of the X-phase, Y-phase and W-phase coils 14X, 14Y and 14W is set to be equal to the number of turns of the U-phase, V-phase and W-phase coils 12U, 12V and 12W.

Figure 11:
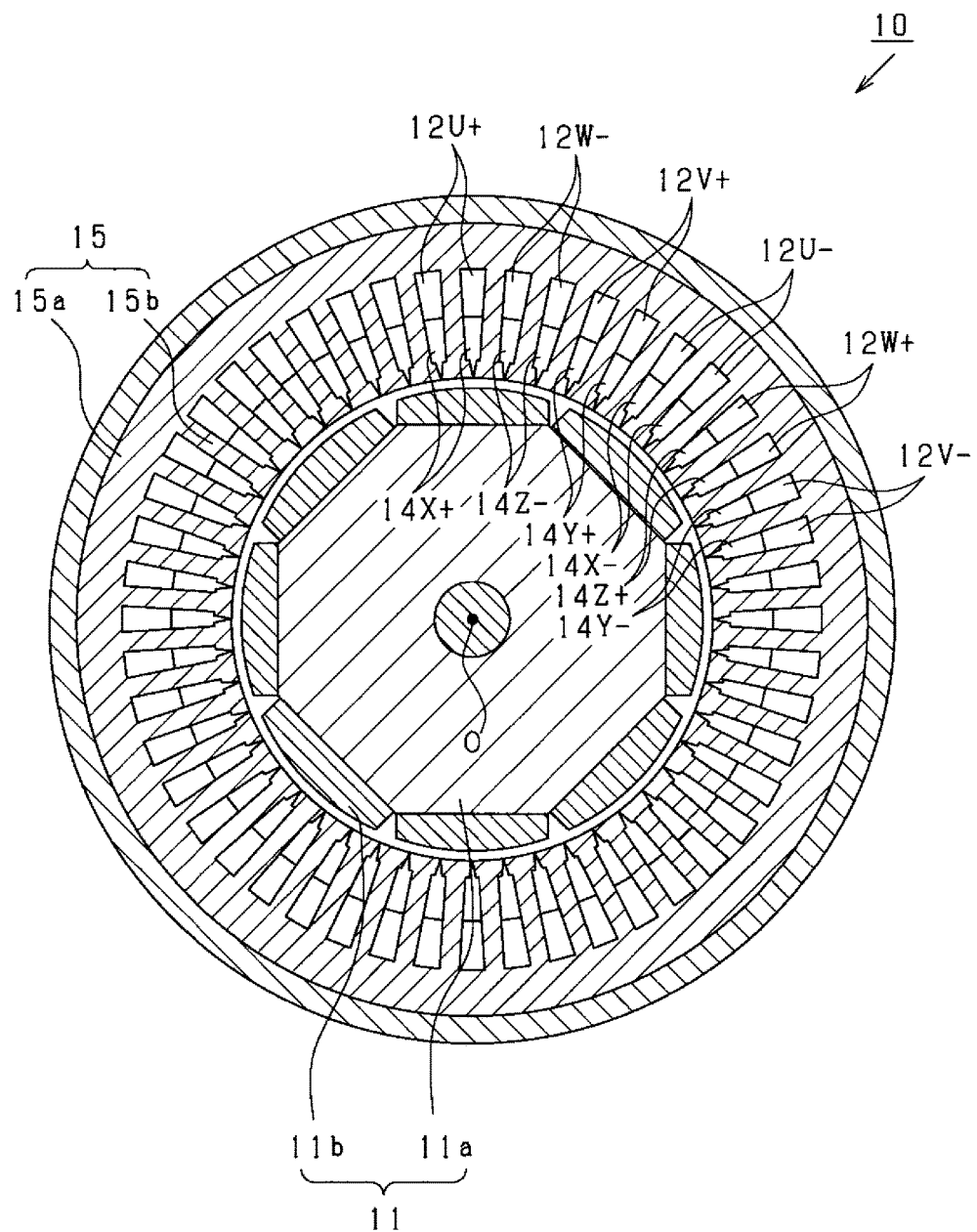
FIG. 11 is a cross-sectional view of a rotating electric machine included in the system according to the second embodiment.

Referring now to FIG. 11, the configuration of the rotating electric machine 10 according to the present embodiment will be described in detail. In addition, FIG. 11 shows a cross section of the rotating electric machine 10 taken along a plane perpendicular to the axis O of rotation of the rotor 11.

As shown in FIG. 11, in the present embodiment, the rotating electric machine 10 includes the rotor 11 and a stator 15. The stator 15 includes the stator core 15a and the first and second three-phase stator coils wound on the stator core 15a.

The stator core 15a has an annular shape and is disposed coaxially with the rotor 11. That is, the axis of the annular stator core 15a coincides with the axis O of rotation of the rotor 11.

In the present embodiment, the rotor 11 is rotatably disposed radially inside the stator 15. That is, the rotating electric machine 10 is configured as an inner rotor-type rotating electric machine.

The rotor 11 includes a rotor core 11a fixed on a rotating shaft and a plurality (e.g., 8 in the present embodiment) of permanent magnets 11b provided on a radially outer periphery of the rotor core 11a. The permanent magnets 11b form a plurality (e.g., 8 in the present embodiment) of magnetic poles the polarities of which alternate between north and south in the circumferential direction of the rotor core 11a.

The stator core 15a has a plurality (e.g., 48 in the present embodiment) of teeth 15b formed at a constant pitch in the circumferential direction thereof. The stator core 15a also has a plurality (e.g., 48 in the present embodiment) of slots each of which is formed between one circumferentially-adjacent pair of the teeth 15b.

The first and second three-phase stator coils are wound on the teeth 15b of the stator core 15a so as to be received in the slots of the stator core 15a.

More specifically, as shown in FIG. 11, the first three-phase stator coil is wound on the teeth 15b of the stator core 15a so as to be received in the slots of the stator core 15a in the order of the U-phase coil 12U+, the W-phase coil 12W−, the V-phase coil 12V+, the U-phase coil 12U−, the W-phase coil 12W+ and the V-phase coil 12V− in the circumferential direction of the stator core 15a. Moreover, each of the U-phase coil 12U+, the W-phase coil 12W−, the V-phase coil 12V+, the U-phase coil 12U−, the W-phase coil 12W+ and the V-phase coil 12V− is received in pairs of circumferentially-adjacent slots of the stator core 15a. In addition, the signs "+" and "−" suffixed to each of the U-phase, V-phase and W-phase coils 12U, 12V and 12W respectively denote opposite polarities of the phase coil.

Similarly, the second three-phase stator coil is wound on the teeth 15b of the stator core 15a so as to be received in the slots of the stator core 15a in the order of the X-phase coil 14X+, the Z-phase coil 14Z−, the Y-phase coil 14Y+, the X-phase coil 14X−, the Z-phase coil 14Z+ and the Y-phase coil 14Y− in the circumferential direction of the stator core 15a. Moreover, each of the X-phase coil 14X+, the Z-phase coil 14Z−, the Y-phase coil 14Y+, the X-phase coil 14X−, the Z-phase coil 14Z+ and the Y-phase coil 14Y− is received in pairs of circumferentially-adjacent slots of the stator core 15a. In addition, the signs "+" and "−" suffixed to each of the X-phase, Y-phase and Z-phase coils 14X, 14Y and 14Z respectively denote opposite polarities of the phase coil.

Moreover, in the present embodiment, each of the U-phase, V-phase and W-phase coils 12U, 12V and 12W of the first three-phase stator coil and a corresponding one of the X-phase, Y-phase and Z-phase coils 14X, 14Y and 14Z of the second three-phase stator coil are arranged in the same slots of the stator core 15a in such a manner as to be electrically insulated from each other. In addition, the U-phase, V-phase and W-phase coils 12U, 12V and 12W of the first three-phase stator coil are located radially outside the X-phase, Y-phase and Z-phase coils 14X, 14Y and 14Z of the second three-phase stator coil.

More specifically, as shown in FIG. 11, the U-phase coil 12U+ and the X-phase coil 14X+ are arranged in the same slots of the stator core 15a in such a manner as to be electrically insulated from each other. In addition, the U-phase coil 12U+ is located radially outside the X-phase coil 14X+.

Similarly, the W-phase coil 12W− and the Z-phase coil 14Z− are arranged in the same slots of the stator core 15a in such a manner as to be electrically insulated from each other. In addition, the W-phase coil 12W− is located radially outside the Z-phase coil 14Z−.

The V-phase coil 12V+ and the Y-phase coil 14Y+ are arranged in the same slots of the stator core 15a in such a manner as to be electrically insulated from each other. In addition, the V-phase coil 12V+ is located radially outside the Y-phase coil 14Y+.

The U-phase coil 12U− and the X-phase coil 14X− are arranged in the same slots of the stator core 15a in such a manner as to be electrically insulated from each other. In addition, the U-phase coil 12U− is located radially outside the X-phase coil 14X−.

The W-phase coil 12W+ and the Z-phase coil 14Z+ are arranged in the same slots of the stator core 15a in such a manner as to be electrically insulated from each other. In addition, the W-phase coil 12W+ is located radially outside the Z-phase coil 14Z+.

The V-phase coil 12V− and the Y-phase coil 14Y− are arranged in the same slots of the stator core 15a in such a manner as to be electrically insulated from each other. In addition, the V-phase coil 12V− is located radially outside the Y-phase coil 14Y−.

It should be noted that for the sake of simplicity, the cross sections of the coils 12U-12W and 14X-14Z are not hatched in FIG. 11.

With the above arrangement of the first and second three-phase stator coils in the slots of the stator core 15a, the spatial phase difference between each corresponding pair of the U-phase, V-phase and W-phase coils 12U, 12V and 12W and the X-phase, Y-phase and Z-phase coils 14X, 14Y and 14Z is equal to 0° in electrical angle.

Moreover, since the first and second three-phase stator coils are wound on the same stator core 15a, it becomes possible to suppress magnetic flux fluctuation in the air gap between the rotor 11 and the stator 15, thereby reducing the torque ripple of the rotating electric machine 10.

Referring back to FIG. 10, in the present embodiment, the rotating electric machine system MU further includes a pair of an X-phase high-side switch SXp and an X-phase low-side switch SXn, a pair of a Y-phase high-side switch SYp and a Y-phase low-side switch SYn, and a pair of a Z-phase high-side switch SZp and a Z-phase low-side switch SZn.

In the present embodiment, each of the X-phase, Y-phase and Z-phase high-side switches SXp, SYp and SZp and the X-phase, Y-phase and Z-phase low-side switches SXn, SYn and SZn is implemented by a voltage control-type semiconductor switching element, more particularly by an N-channel MOSFET. Accordingly, for each of the switches SXp-SZp and SXn-SZn, the high potential-side terminal is the drain and the low potential-side terminal is the source. In addition, each of the switches SXp-SZp and SXn-SZn has a body diode (not shown) connected in antiparallel thereto.

The drains of the X-phase, Y-phase and Z-phase high-side switches SXp, SYp and SZp are electrically connected to the positive terminal of the DC power source 30 via the positive conductor Lp. On the other hand, the sources of the X-phase, Y-phase and Z-phase low-side switches SXn, SYn and SZn are electrically connected to the negative terminal of the DC power source 30 via the negative conductor Ln.

First ends of the X-phase, Y-phase and Z-phase coils 14X, 14Y and 14Z are respectively electrically connected with the drains of the X-phase, Y-phase and Z-phase low-side switches SXn, SYn and SZn. On the other hand, second ends of the X-phase, Y-phase and Z-phase coils 14X, 14Y and 14Z are electrically connected with each other at the second neutral point N2.

In the present embodiment, the rotating electric machine system MU further includes a second selector switch 60. The second selector switch 60 selectively electrically connects each of the sources of the X-phase, Y-phase and Z-phase high-side switches SXp, SYp and SZp to either a corresponding one of the drains of the X-phase, Y-phase and Z-phase low-side switches SXn, SYn and SZn or the second neutral point N2 between the X-phase, Y-phase and Z-phase coils 14X, 14Y and 14Z.

Figure 12:
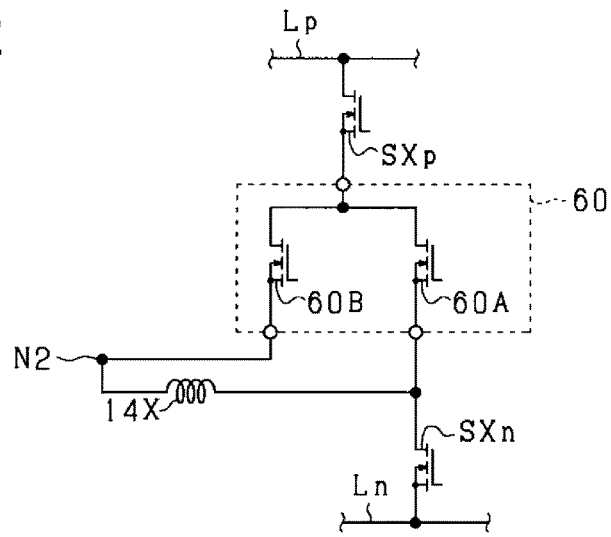
FIG. 12 is a circuit diagram of an X-phase part of a second selector switch included in the system according to the second embodiment.

FIG. 12 illustrates the configuration of the second selector switch 60 according to the present embodiment. The second selector switch 60 includes an X-phase part, a Y-phase part and a Z-phase part which respectively correspond to the X, Y and Z phases. The X-phase, Y-phase and Z-phase parts of the second selector switch 60 are identical in configuration. Therefore, for the sake of simplicity, only the X-phase part of the second selector switch 60 is shown in FIG. 12.

As shown in FIG. 12, the X-phase part of the second selector switch 60 includes a third connection switch 60A and a fourth connection switch 60B. In the present embodiment, each of the third and fourth connection switches 60A and 60B is implemented by an N-channel MOSFET. The third connection switch 60A has its drain electrically connected with the source of the X-phase high-side switch SXp and its source electrically connected with the drain of the X-phase low-side switch SXn. On the other hand, the fourth connection switch 60B has its drain electrically connected with the source of the X-phase high-side switch SXp and its source electrically connected with the second neutral point N2.

In the present embodiment, the control apparatus 50 controls the second selector switch 60 as well as the first selector switch 40.

Specifically, referring to FIG. 12, the control apparatus 50 performs a third switching process in which the third connection switch 60A is turned off and the fourth connection switch 60B is turned on, thereby electrically connecting the source of the X-phase high-side switch SXp to the second neutral point N2. Moreover, the control apparatus 50 also performs a fourth switching process in which the third connection switch 60A is turned on and the fourth connection switch 60B is turned off, thereby electrically connecting the source of the X-phase high-side switch SXp to the drain of the X-phase low-side switch SXn.

Further, in the present embodiment, in the third switching process, the control apparatus 50 turns on the fourth connection switch 60B before turning off the third connection switch 60A. Consequently, in the third switching process, there is a time period for which both the third and fourth connection switches 60A and 60B are kept on by the control apparatus 50. Moreover, in the fourth switching process, the control apparatus 50 turns on the third connection switch 60A before turning off the fourth connection switch 60B. Consequently, in the fourth switching process, there is also a time period for which both the third and fourth connection switches 60A and 60B are kept on by the control apparatus 50. Performing the third and fourth switching processes as above, it is possible to prevent an electric current flow path which includes the X-phase coil 14X from being cut off due to the switching of the drive states of the third and fourth connection switches 60A and 60B, thereby suppressing the generation of a surge voltage.

In the present embodiment, the control apparatus 50 controls the first selector switch 40 to perform, for each of the U-phase, V-phase and W-phase coils 12U, 12V and 12W, the switching between electrically connecting the drain of the corresponding low-side switch to the source of the corresponding high-side switch and electrically connecting the drain of the corresponding low-side switch to the first neutral point N1 only when the absolute value of the phase current flowing in the phase coil is less than or equal to a first threshold current value Ith1. Moreover, the control apparatus 50 controls the second selector switch 60 to perform, for each of the X-phase, Y-phase and W-phase coils 14X, 14Y and 14Z, the switching between electrically connecting the source of the corresponding high-side switch to the drain of the corresponding low-side switch and electrically connecting the source of the corresponding high-side switch to the second neutral point N2 only when the absolute value of the phase current flowing in the phase coil is less than or equal to a second threshold current value Ith2.

In addition, the first and second threshold current values Ith1 and Ith2 may be set to be equal to each other or different from each other. The absolute value of the phase current may be calculated based on either the phase current detectable by the corresponding shunt resistor or the magnetic pole position information Sig, as described in the first embodiment.

In the present embodiment, the control apparatus 50 controls the on-off switching of the switches SUp-SWp, SUn-SWn, SXp-SZp and SXn-SZn on the basis of the magnetic pole position information Sig, thereby driving the rotating electric machine 10 to function as an electric motor.

Specifically, when the rotational speed Nm of the rotor 11 calculated on the basis of the magnetic pole position information Sig is not higher than the first predetermined speed Nth1, the control apparatus 50 performs a full-wave drive process for full-wave driving the rotating electric machine 10.

In the full-wave drive process, with the first selector switch 40 controlled to electrically connect the drains of the U-phase, V-phase and W-phase low-side switches SUn, SVn and SWn respectively to the sources of the U-phase, V-phase and W-phase high-side switches SUp, SVp and SWp, the control apparatus 50 controls the on-off switching of the switches SUp-SWp and SUn-SWn so that the U-phase, V-phase and W-phase high-side switches SUp, SVp and SWp are alternately turned on respectively with the U-phase, V-phase and W-phase low-side switches SUn, SVn and SWn. Consequently, three-phase symmetrical alternating current is supplied from the junction points between the U-phase, V-phase and W-phase high-side switches SUp, SVp and SWp and the U-phase, V-phase and W-phase low-side switches SUn, SVn and SWn to the U-phase, V-phase and W-phase coils 12U, 12V and 12W. Moreover, with the second selector switch 60 controlled to electrically connect the sources of the X-phase, Y-phase and Z-phase high-side switches SXp, SYp and SZp to the drains of the X-phase, Y-phase and Z-phase low-side switches SXn, SYn and SZn, the control apparatus 50 controls the on-off switching of the switches SXp-SZp and SXn-SZn so that the X-phase, Y-phase and Z-phase high-side switches SXp, SYp and SZp are alternately turned on respectively with the X-phase, Y-phase and Z-phase low-side switches SXn, SYn and SZn. Consequently, three-phase symmetrical alternating current is supplied from the junction points between the X-phase, Y-phase and Z-phase high-side switches SXp, SYp and SZp and the X-phase, Y-phase and Z-phase low-side switches SXn, SYn and SZn to the X-phase, Y-phase and Z-phase coils 14X, 14Y and 14Z.

On the other hand, when the calculated rotational speed Nm of the rotor 11 is higher than the first predetermined speed Nth1, the control apparatus 50 performs a half-wave drive process for half-wave driving the rotating electric machine 10.

Figure 13:
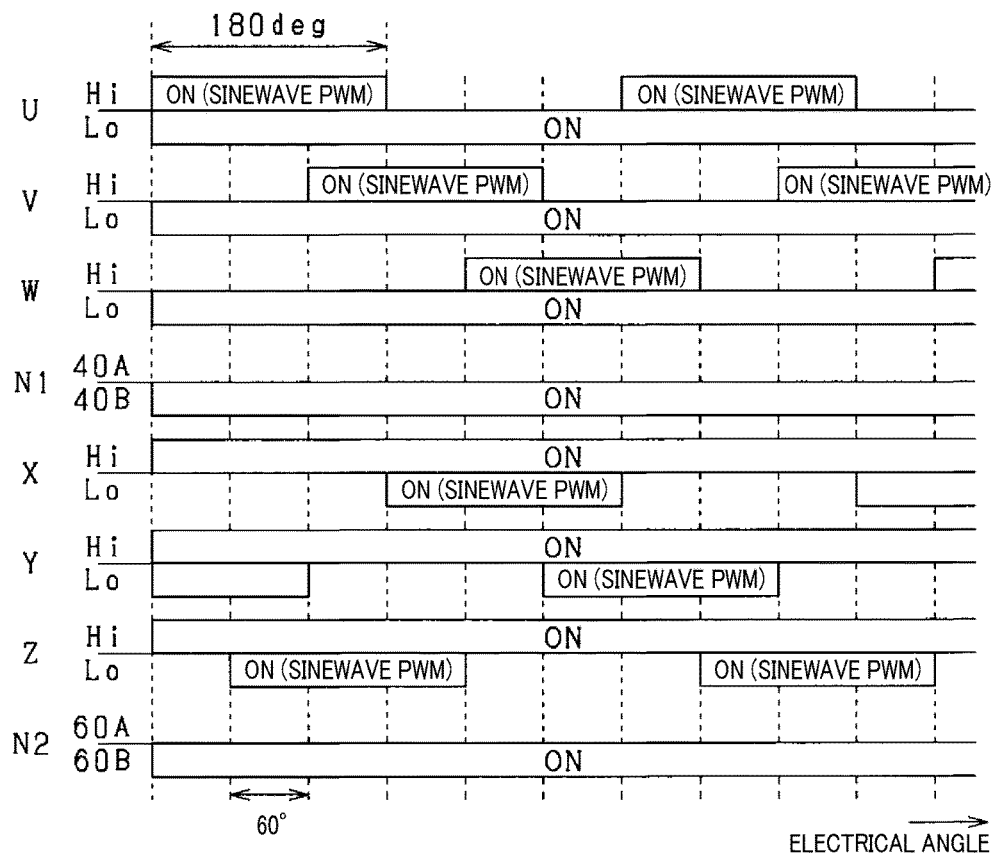
FIG. 13 is a schematic view illustrating control of the on-off switching of U-phase, V-phase and W-phase high-side switches and X-phase, Y-phase and W-phase low-side switches in a half-wave drive process according to the second embodiment.

In the half-wave drive process, with the first selector switch 40 controlled to electrically connect all the drains of the U-phase, V-phase and W-phase low-side switches SUn, SVn and SWn to the first neutral point N1, the control apparatus 50 controls the on-off switching of the U-phase, V-phase and W-phase high-side switches SUp, SVp and SWp according to an energization pattern as shown in FIG. 13 while keeping all the U-phase, V-phase and W-phase low-side switches SUn, SVn and SWn in an on state. Moreover, with the second selector switch 60 controlled to electrically connect all the sources of the X-phase, Y-phase and Z-phase high-side switches SXp, SYp and SZp to the second neutral point N2, the control apparatus 50 controls the on-off switching of the X-phase, Y-phase and Z-phase low-side switches SXn, SYn and SZn according to the energization pattern as shown in FIG. 13 while keeping all the X-phase, Y-phase and Z-phase high-side switches SXp, SYp and SZp in an on state.

Specifically, as shown in FIG. 13, the control apparatus 50 offsets the start timings of energization of the U-phase, V-phase and W-phase high-side switches SUp, SVp and SWp from each other by 120° in electrical angle. Moreover, the control apparatus 50 cyclically energizes each of the U-phase, V-phase and W-phase high-side switches SUp, SVp and SWp at intervals of 180° in electrical angle. Hence, for each of the U-phase, V-phase and W-phase high-side switches SUp, SVp and SWp, there exist deenergization periods of 180° in electrical angle. Furthermore, the energization periods of the U-phase, V-phase and W-phase high-side switches SUp, SVp and SWp overlap each other by 60° in electrical angle.

Similarly, the control apparatus 50 also offsets the start timings of energization of the X-phase, Y-phase and Z-phase low-side switches SXn, SYn and SZn from each other by 120° in electrical angle. Moreover, the control apparatus 50 cyclically energizes each of the X-phase, Y-phase and Z-phase low-side switches SXn, SYn and SZn at intervals of 180° in electrical angle. Hence, for each of the X-phase, Y-phase and Z-phase low-side switches SXn, SYn and SZn, there exist deenergization periods of 180° in electrical angle. Furthermore, the energization periods of the X-phase, Y-phase and Z-phase low-side switches SXn, SYn and SZn overlap each other by 60° in electrical angle.

As described previously, in the present embodiment, the first and second three-phase stator coils are wound on the stator core 15a so that each of the U-phase, V-phase and W-phase coils 12U, 12V and 12W has the same spatial phase as a corresponding one of the X-phase, Y-phase and Z-phase coils 14X, 14Y and 14Z. Moreover, for each same-spatial phase pair of the U-phase, V-phase and W-phase coils 12U, 12V and 12W and the X-phase, Y-phase and Z-phase coils 14X, 14Y and 14Z, the start timings of energization of a corresponding pair of the U-phase, V-phase and W-phase high-side switches SUp, SVp and SWp and the X-phase, Y-phase and Z-phase low-side switches SXn, SYn and SZn are offset from each other by 180° in electrical angle; the corresponding pair of the switches respectively correspond to the same-spatial phase pair of the coils.

More specifically, the U-phase coil 12U has the same spatial phase as the X-phase coil 14X; the start timings of energization of the U-phase high-side switch SUp and the X-phase low-side switch SXn are offset from each other by 180° in electrical angle. The V-phase coil 12V has the same spatial phase as the Y-phase coil 14Y; the start timings of energization of the V-phase high-side switch SVp and the Y-phase low-side switch SYn are offset from each other by 180° in electrical angle. The W-phase coil 12W has the same spatial phase as the Z-phase coil 14Z; the start timings of energization of the W-phase high-side switch SWp and the Z-phase low-side switch SZn are offset from each other by 180° in electrical angle.

Figure 14:
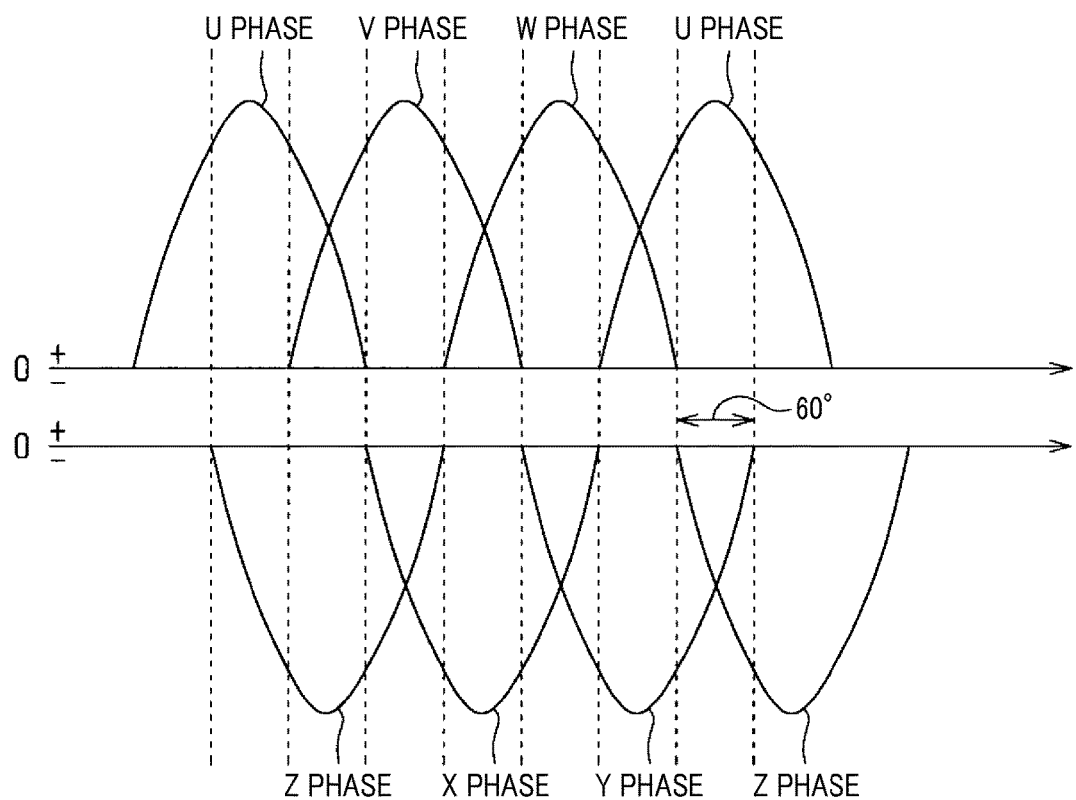
FIG. 14 is a waveform chart illustrating the waveforms of phase currents flowing in first and second three-phase stator coils during the half-wave drive process according to the second embodiment.

In the present embodiment, the energization control of the U-phase, V-phase and W-phase high-side switches SUp, SVp and SWp and the X-phase, Y-phase and Z-phase low-side switches SXn, SYn and SZn is carried out by a sinewave PWM control. Consequently, as shown in FIG. 14, the waveforms of the U-phase, V-phase and W-phase currents flowing respectively in the U-phase, V-phase and W-phase coils 12U, 12V and 12W and the X-phase, Y-phase and Z-phase currents flowing respectively in the X-phase, Y-phase and Z-phase coils 14X, 14Y and 14Z have the shape of a half sine wave. More specifically, in each of the U-phase, V-phase and W-phase coils 12U, 12V and 12W and the X-phase, Y-phase and Z-phase coils 14X, 14Y and 14Z, the phase current flows for only half of each sinusoidal cycle (i.e., 360°/2=180° in electrical angle).

In addition, in FIG. 14, the directions of the U-phase, V-phase and W-phase currents are defined to be positive when these currents flow respectively from the first ends of the U-phase, V-phase and W-phase coils 12U, 12V and 12W to the first neutral point N1 and be negative in the opposite directions. The directions of the X-phase, Y-phase and Z-phase currents are defined to be positive when these currents flow respectively from the first ends of the X-phase, Y-phase and Z-phase coils 14X, 14Y and 14Z to the second neutral point N2 and be negative in the opposite directions.

Figure 15:
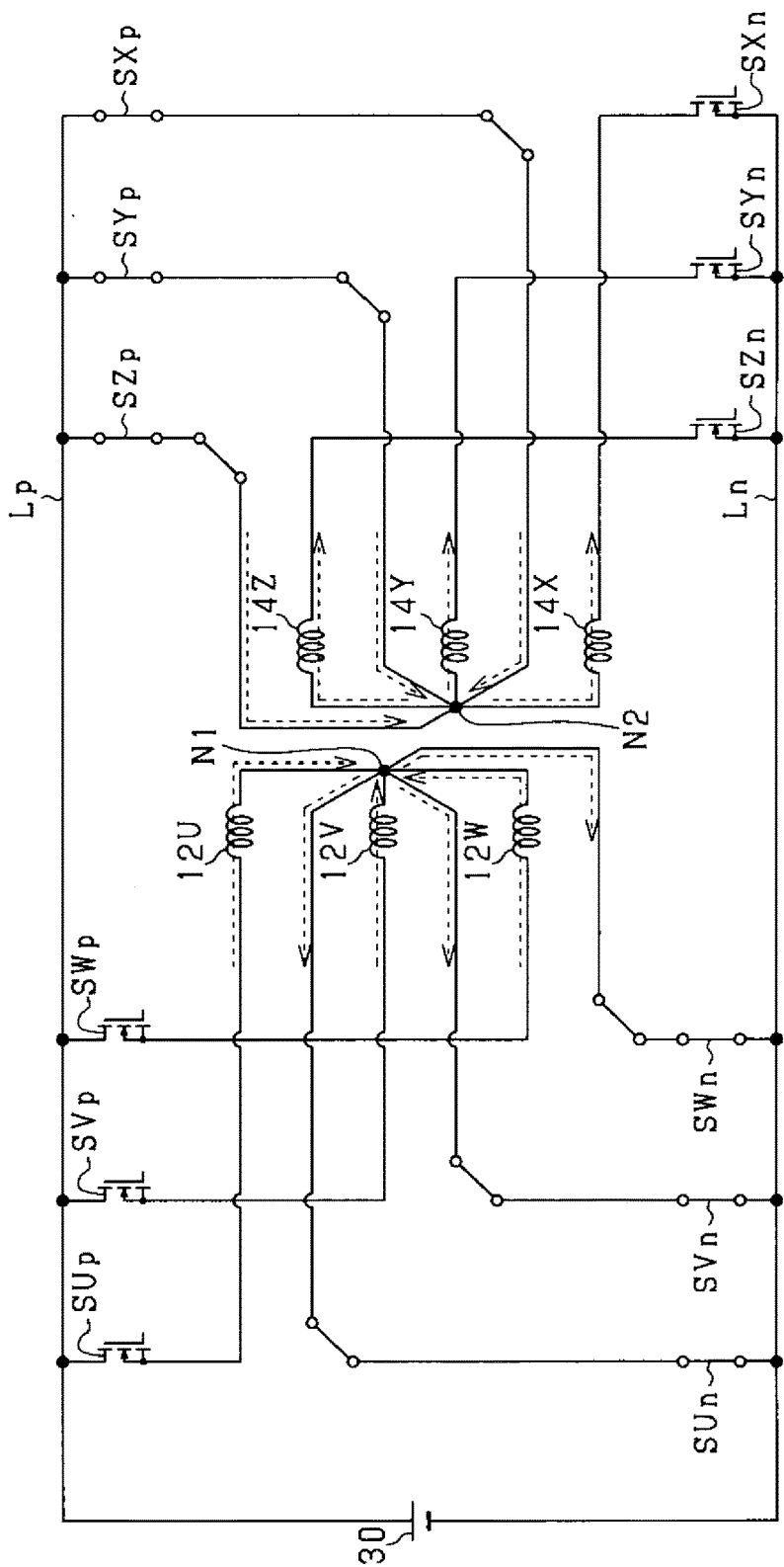
FIG. 15 is a schematic view illustrating the electric current flow paths in the rotating electric machine during the half-wave drive process according to the second embodiment.

FIG. 15 illustrates the electric current flow paths in the rotating electric machine 10 when the U-phase, V-phase and W-phase high-side switches SUp, SVp and SWp and the X-phase, Y-phase and Z-phase low-side switches SXn, SYn and SZn are driven according to the energization pattern as shown in FIG. 13.

In the first three-phase stator coil, as indicated with dashed-line arrows in FIG. 15, electric current flows through a loop path which includes the positive terminal of the DC power source 30, the positive conductor Lp, at least one of the U-phase, V-phase and W-phase high-side switches SUp, SVp and SWp which is in an on state, the first neutral point N1, the U-phase, V-phase and W-phase low-side switches SUn, SVn and SWn, the negative conductor Ln and the negative terminal of the DC power source 30. That is, electric current flows from the DC power source 30 to the U-phase, V-phase and W-phase coils 12U, 12V and 12W via the U-phase, V-phase and W-phase high-side switches SUp, SVp and SWp and returns to the DC power source 30 via the U-phase, V-phase and W-phase low-side switches SUn, SVn and SWn.

In the second three-phase stator coil, as indicated with dashed-line arrows in FIG. 15, electric current flows through a loop path which includes the positive terminal of the DC power source 30, the positive conductor Lp, the X-phase, Y-phase and Z-phase high-side switches SXp, SYp and SZp, the second neutral point N2, at least one of the X-phase, Y-phase and Z-phase low-side switches SXn, SYn and SZn which is in an on state, the negative conductor Ln and the negative terminal of the DC power source 30. That is, electric current flows from the DC power source 30 to the X-phase, Y-phase and Z-phase coils 14X, 14Y and 14Z via the X-phase, Y-phase and Z-phase high-side switches SXp, SYp and SZp and returns to the DC power source 30 via the X-phase, Y-phase and Z-phase low-side switches SXn, SYn and SZn.

Next, referring to FIG. 16, advantageous effects achievable by the half-wave drive process according to the present embodiment will be described.

Figure 16:
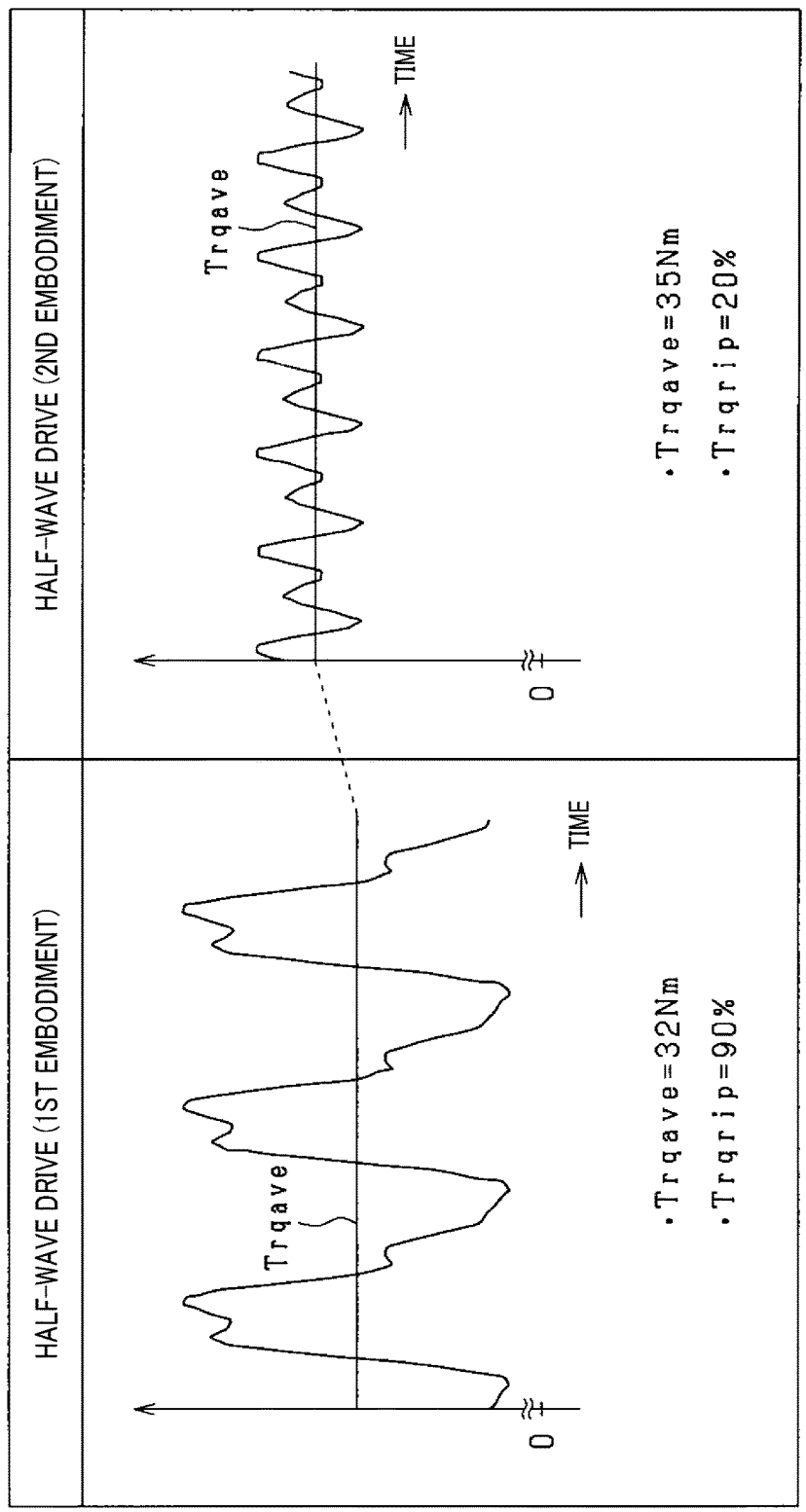
FIG. 16 is a schematic view illustrating advantageous effects achievable by the half-wave drive process according to the second embodiment.

As shown in FIG. 16, with the half-wave drive process according to the present embodiment, it becomes possible to reduce the torque ripple Trqrip of the rotating electric machine 10 in comparison with the half-wave drive process according to the first embodiment.

More specifically, in the case of performing the half-wave drive process according to the present embodiment, the torque ripple Trqrip is only 20% of the average torque Trqave of the rotating electric machine 10. In compassion, in the case of performing the half-wave drive process according to the first embodiment, the torque ripple Trqrip is 90% of the average torque Trqave of the rotating electric machine 10.

The causes of the above reduction in the torque ripple Trqrip are as follows. In the present embodiment, the directions of the U-phase, V-phase and W-phase currents flowing in the U-phase, V-phase and W-phase coils 12U, 12V and 12W with respect to the first neutral point N1 are opposite to the directions of the X-phase, Y-phase and Z-phase currents flowing in the X-phase, Y-phase and Z-phase coils 14X, 14Y and 14Z with respect to the second neutral point N2; thus it becomes possible to reduce the maximum instantaneous torque while increasing the minimum instantaneous torque of the rotating electric machine 10.

In particular, the half-wave drive process according to the present embodiment has the following features (A), (B) and (C). Consequently, it becomes possible to cause, for example, the Z-phase current flowing in the Z-phase coil 14Z, which has the same spatial phase as the W-phase coil 12W, to be maximum at an intermediate timing between the start timing of energization of the U-phase coil 12U and the end timing of energization of the V-phase coil 12V; at the intermediate timing, the W-phase current flowing in the W-phase coil 12W is zero (see FIGS. 13-14). As a result, it becomes possible to remarkably reduce the torque ripple Trqrip of the rotating electric machine 10.

(A) The start timings of energization of the U-phase, V-phase and W-phase high-side switches SUp, SVp and SWp are offset from each other by 120° (i.e., 360°/3) in electrical angle. The start timings of energization of the X-phase, Y-phase and Z-phase low-side switches SXn, SYn and SZn are also offset from each other by 120° in electrical angle.

(B) The U-phase coil 12U has the same spatial phase as the X-phase coil 14X; the start timings of energization of the U-phase high-side switch SUp and the X-phase low-side switch SXn are offset from each other by 180° in electrical angle. The V-phase coil 12V has the same spatial phase as the Y-phase coil 14Y; the start timings of energization of the V-phase high-side switch SVp and the Y-phase low-side switch SYn are offset from each other by 180° in electrical angle. The W-phase coil 12W has the same spatial phase as the Z-phase coil 14Z; the start timings of energization of the W-phase high-side switch SWp and the Z-phase low-side switch SZn are offset from each other by 180° in electrical angle.

(C) Each of the U-phase, V-phase and W-phase coils 12U, 12V and 12W and the X-phase, Y-phase and Z-phase coils 14X, 14Y and 14Z is energized for half of each sinusoidal cycle (i.e., 360°/2=180° in electrical angle). In other words, the energization periods of these coils 12U-12W and 14X-14Z are set to 180° in electrical angle.

Referring again to FIG. 16, with the half-wave drive process according to the present embodiment, it also becomes possible to increase the average torque Trqave of the rotating electric machine 10 in comparison with the half-wave drive process according to the first embodiment.

More specifically, in the case of performing the half-wave drive process according to the present embodiment, the average torque Trqave of the rotating electric machine 10 is equal to 35 Nm. In compassion, in the case of performing the half-wave drive process according to the first embodiment, the average torque Trqave of the rotating electric machine 10 is equal to 32 Nm. In addition, the average torque Trqave is approximately equal to the average value of the maximum and minimum torques of the rotating electric machine 10.

The causes of the above increase in the average torque Trqave are as follows. In the present embodiment, by taking the same-spatial phase pair of the U-phase coil 12U and the X-phase coil 14X as an example, during the deenergization periods of the U-phase coil 12U, the X-phase coil 14X is energized so that the X-phase current, whose direction is opposite to the direction of the U-phase current, flows in the X-phase coil 14X (see FIGS. 13-14). Consequently, it becomes possible to raise the minimum value of the cyclically-changing torque of the rotating electric machine 10, thereby increasing the average torque Trqave.

In addition, with the half-wave drive process according to the present embodiment, it also becomes possible to reduce the electric current ripples generated in the positive and negative conductors Lp and Ln, thereby making it possible to lower the capacitance of the capacitor 31. As a result, it becomes possible to minimize the size of the capacitor 31.

While the above particular embodiments have been shown and described, it will be understood by those skilled in the art that various modifications, changes and improvements may be made without departing from the spirit of the present invention.

For example, in the second embodiment, the spatial phase difference between each corresponding pair of the U-phase, V-phase and W-phase coils 12U, 12V and 12W and the X-phase, Y-phase and Z-phase coils 14X, 14Y and 14Z is set to 0° in electrical angle.

Figure 17:
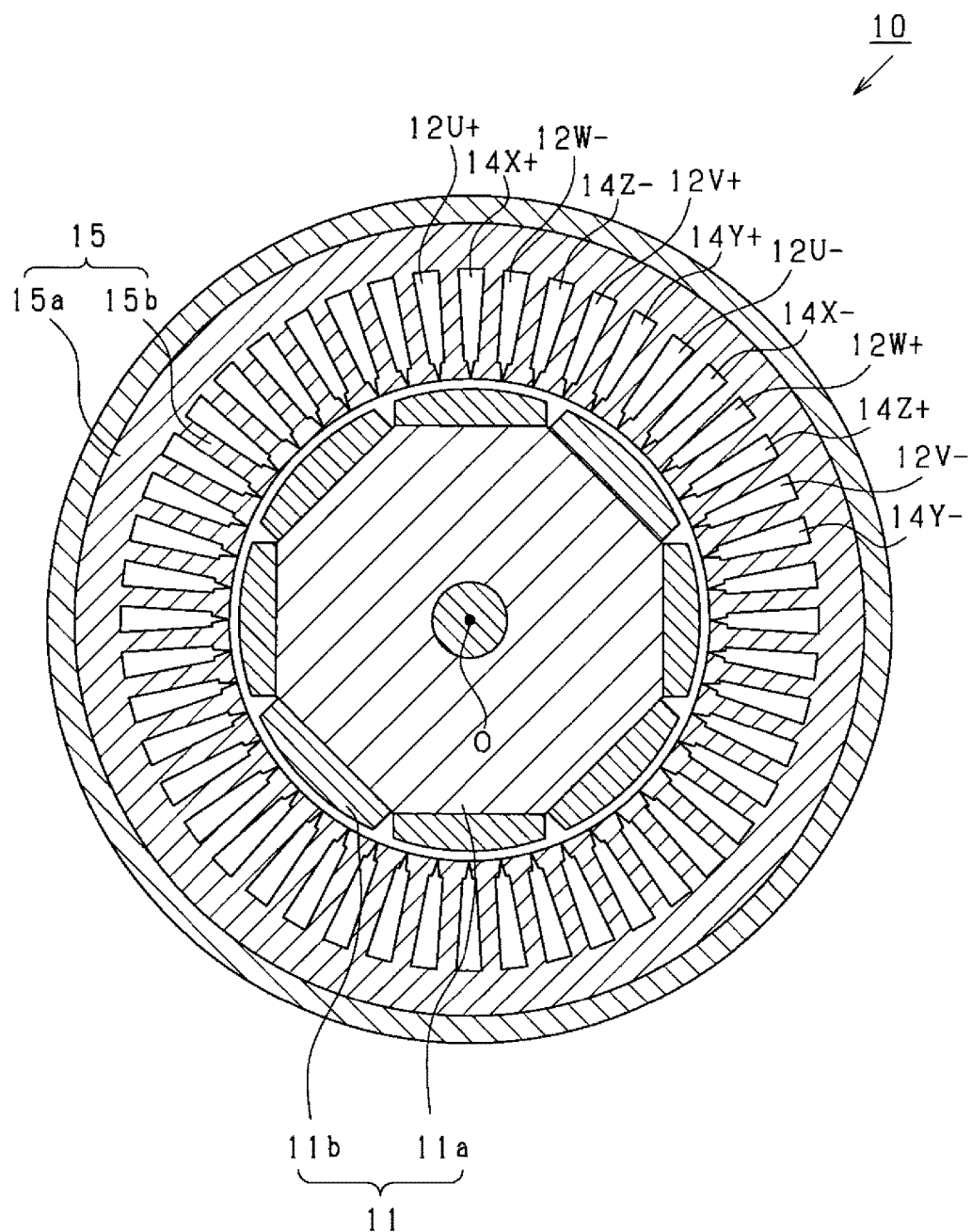
FIG. 17 is a cross-sectional view of a rotating electric machine according to a modification of the second embodiment.

However, the spatial phase difference between each corresponding pair of the U-phase, V-phase and W-phase coils 12U, 12V and 12W and the X-phase, Y-phase and Z-phase coils 14X, 14Y and 14Z may also be set to other values, such as 30° in electrical angle as shown in FIG. 17. More specifically, in this case, the first and second three-phase stator coils are wound on the teeth 15b of the stator core 15a so as to be received in the slots of the stator core 15a in the order of the U-phase coil 12U+, the X-phase coil 14X+, the W-phase coil 12W−, the Z-phase coil 14Z−, the V-phase coil 12V+, the Y-phase coil 14Y+, the U-phase coil 12U−, the X-phase coil 14X−, the W-phase coil 12W+, the Z-phase coil 14Z+, the V-phase coil 12V− and the Y-phase coil 14Y− in the circumferential direction of the stator core 15a. Moreover, six slot-pitches in the circumferential direction of the stator core 15a are equal to 180° in electrical angle. Hence, circumferentially-adjacent slots of the stator core 15a are spaced from each other by 30° (i.e., 180°/6) in electrical angle. In this case, it is still possible to reduce the torque ripple of the rotating electric machine 10 in comparison with the first embodiment.

In the first embodiment, it is also possible to electrically connect, instead of the sources of the U-phase, V-phase and W-phase high-side switches SUp, SVp and SWp, the drains of the U-phase, V-phase and W-phase low-side switches SUn, SVn and SWn respectively to the non-neutral point-side ends of the U-phase, V-phase and W-phase coils 12U, 12V and 12W. In this case, each of the U-phase, V-phase and W-phase low-side switches SUn, SVn and SWn constitutes a "permanently-connected switch" which is permanently (or always) electrically connected with a corresponding one of the U-phase, V-phase and W-phase coils 12U, 12V and 12W. Moreover, each of the drains (or higher potential-side terminals) of the U-phase, V-phase and W-phase low-side switches SUn, SVn and SWn constitutes a "permanently-connected terminal" which is permanently electrically connected with a corresponding one of the non-neutral point-side ends of the U-phase, V-phase and W-phase coils 12U, 12V and 12W. On the other hand, each of the U-phase, V-phase and W-phase high-side switches SUp, SVp and SWp constitutes a "selectively-connected switch" which is selectively electrically connected with either a corresponding one of the permanently-connected switches (i.e., the U-phase, V-phase and W-phase low-side switches SUn, SVn and SWn) or the neutral point N. Moreover, each of the sources (or low potential-side terminals) of the U-phase, V-phase and W-phase high-side switches SUp, SVp and SWp constitutes a "selectively-connected terminal" which is selectively electrically connected with either a corresponding one of the permanently-connected terminals (i.e., the drains of the U-phase, V-phase and W-phase low-side switches SUn, SVn and SWn) or the neutral point N. The selector switch 40 selectively electrically connects each of the selectively-connected terminals of the selectively-connected switches (i.e., the sources of the U-phase, V-phase and W-phase high-side switches SUp, SVp and SWp) to either a corresponding one of the permanently-connected terminals of the permanently-connected switches (i.e., the drains of the U-phase, V-phase and W-phase low-side switches SUn, SVn and SWn) or the neutral point N.

In the first embodiment, the energization control of the U-phase, V-phase and W-phase high-side switches SUp, SVp and SWp is carried out by the sinewave PWM control. However, the energization control of the switches SUp, SVp and SWp may also be carried out by other methods. For example, each of the switches SUp, SVp and SWp may be kept on for half of each cycle. Alternatively, each of the switches SUp, SVp and SWp may be on-off switched at a predetermined duty cycle in the energization periods thereof. Here, the duty cycle denotes the ratio Ton/Tsw, where Ton is the on time in each energization period and Tsw is the length of each energization period.

Similarly, in the second embodiment, the energization control of the X-phase, Y-phase and Z-phase low-side switches SXn, SYn and SZn may also be carried out by, instead of the sinewave PWM control, other methods as described above.

In the first and second embodiments, each of the energization periods of the U-phase, V-phase and W-phase high-side switches SUp, SVp and SWp is set to half of each cycle (i.e., 360°/2=180° in electrical angle). However, each of the energization periods of the U-phase, V-phase and W-phase high-side switches SUp, SVp and SWp may also be set to be longer than or equal to 120° and shorter than 180°, preferably set to be longer than or equal to 150° and shorter than 180° in electrical angle.

Similarly, in the second embodiment, each of the energization periods of the X-phase, Y-phase and Z-phase low-side switches SXn, SYn and SZn may also be set to be longer than or equal to 120° and shorter than 180°, preferably set to be longer than or equal to 150° and shorter than 180° in electrical angle.

In the second embodiment, the length of the energization periods of the U-phase, V-phase and W-phase high-side switches SUp, SVp and SW (to be referred to as first predetermined periods hereinafter) and the length of the energization periods of the X-phase, Y-phase and Z-phase low-side switches SXn, SYn and SZn (to be referred to as second predetermined periods hereinafter) are set to be equal to each other. However, the length of the first predetermined periods and the length of the second predetermined periods may also be set to be different from each other provided that it is still possible to more effectively reduce the torque ripple in comparison with the first embodiment.

In the first and second embodiments, the number of phases of the stator coils is set to 3. However, the number of phases of the stator coils may be set to N, where N is an integer greater than or equal to 2, such as 2 or 4. In this case, each of the N-phase stator coils includes N phase coils that respectively belong to the N phases and are electrically connected with each other to define a neutral point N therebetween. Moreover, for each of the N-phase stator coils, the number of the corresponding high-side switches, the number of the corresponding low-side switches and the number of pairs of the first and second connection switches included in corresponding selector switch are also set to N. Moreover, in the half-wave drive process according to the first embodiment, the control apparatus 50 may cyclically energize the N high-side switches so that the start timings of energization of the N high-side switches are offset from each other by 360°/N in electrical angle. Similarly, in the half-wave drive process according to the second embodiment, the control apparatus 50 may cyclically energize the N high-side switches corresponding to the first N-phase stator coil so that the start timings of energization of the N high-side switches are offset from each other by 360°/N in electrical angle; the control apparatus 50 may also cyclically energize the N low-side switches corresponding to the second N-phase stator coil so that the start timings of energization of the N low-side switches are offset from each other by 360°/N in electrical angle. In addition, in this case, each of the energization periods of the switches may be set to be longer than or equal to (90°+180°/N) and shorter than or equal to 180° in electrical angle.

In the first and second embodiments, it is possible to omit at least one of the processes illustrated in FIGS. 9 and 10.

In the second embodiment, in the half-wave drive process, the control apparatus 50 may drive only the switches SUp-SWp and SUn-SWn corresponding to the U-phase, V-phase and W-phase coils 12U, 12V and 12W while keeping the switches SXp-SZp and SXn-SZn corresponding to the X-phase, Y-phase and Z-phase coils 14X, 14Y and 14Z in an off state. Alternatively, the control apparatus 50 may drive only the switches SXp-SZp and SXn-SZn while keeping the switches SUp-SWp and SUn-SWn in an off state.

In the first and second embodiments, each of the switches is implemented by an N-channel MOSFET. However, each of the switches may alternatively be implemented by any other semiconductor switching element, such as an IGBT (Insulated Gate Bipolar Transistor). In the case of an IGBT, the high potential-side terminal is the collector and the low potential-side terminal is the emitter. In addition, each of the switches may be formed, for example, of Si, SiC or GaN.

In the first and second embodiments, the rotating electric machine 10 is configured as a permanent magnet-type rotating electric machine. However, the rotating electric machine 10 may also be configured as a field winding-type rotating electric machine. Alternatively, the rotating electric machine 10 may also be configured to include a field winding as well as a plurality of permanent magnets.

In the first and second embodiments, the DC power source 30 is implemented by a battery whose rated voltage is 12V. However, the DC power source 30 may also be implemented by a high-voltage battery whose rated voltage is 100V or more.

In the first and second embodiments, each of the selector switches may also be implemented by a relay.

In the first and second embodiments, the rotating electric machine 10 is mechanically connected with the output shaft of the engine 20 via the belt. However, the rotating electric machine 10 may be included in the power transmission path connecting the output shaft of the engine 20 and the driving wheels 21 so as to be mechanically connected between the transmission and the driving holes 21. Alternatively, the rotating electric machine 10 may be included in the power transmission path so as to be mechanically connected between the engine 20 and the transmission.

What is claimed is:

1. A rotating electric machine system comprising a rotating electric machine and an electric power conversion circuit between which electric power is transferred, the rotating electric machine including a stator core, and N coils wound on the stator core and respectively belonging to N phases, where N is an integer greater than or equal to 2, the coils being electrically connected with each other to define a neutral point therebetween, the electric power conversion circuit comprising N high-side switches, N low-side switches, a selector switch, a full-wave driver, a half-wave driver and a drive controller, the N high-side switches respectively corresponding to the N coils and each having a high potential-side terminal and a low potential-side terminal, all the high potential-side terminals of the high-side switches being electrically connected to a positive terminal of a DC power source, the N low-side switches respectively corresponding to the N coils and each having a high potential-side terminal and a low potential-side terminal, all the low potential-side terminals of the low-side switches being electrically connected to a negative terminal of the DC power source, the high-side switches being either configured as permanently-connected switches with the low-side switches configured as selectively-connected switches or configured as selectively-connected switches with the low-side switches configured as permanently-connected switches, each of the permanently-connected switches being permanently electrically connected with a corresponding one of the coils of the rotating electric machine, each of the selectively-connected switches being selectively electrically connected with either a corresponding one of the permanently-connected switches or the neutral point between the coils, for each of the permanently-connected switches, that one of the high potential-side and low potential-side terminals of the permanently-connected switch which is electrically connected with neither the positive terminal nor the negative terminal of the DC power source constituting a permanently-connected terminal, each of the permanently-connected terminals of the permanently-connected switches being permanently electrically connected with a corresponding one of non-neutral point-side ends of the coils of the rotating electric machine, for each of the selectively-connected switches, that one of the high potential-side and low potential-side terminals of the selectively-connected switch which is electrically connected with neither the positive terminal nor the negative terminal of the DC power source constituting a selectively-connected terminal, the selector switch selectively electrically connecting each of the selectively-connected terminals of the selectively-connected switches to either a corresponding one of the permanently-connected terminals of the permanently-connected switches or the neutral point between the coils, the full-wave driver being configured to perform a full-wave drive process for full-wave driving the rotating electric machine, wherein in the full-wave drive process, the full-wave driver controls on-off switching of the permanently-connected switches and the selectively-connected switches with the selectively-connected terminals of the selectively-connected switches electrically connected with the corresponding permanently-connected terminals of the permanently-connected switches by the selector switch, the half-wave driver being configured to perform a half-wave drive process for half-wave driving the rotating electric machine, wherein in the half-wave drive process, the half-wave driver controls the on-off switching of the permanently-connected switches with the selectively-connected terminals of the selectively-connected switches electrically connected with the neutral point by the selector switch and with the selectively-connected switches kept on, and the drive controller being configured to control both the full-wave driver and the half-wave driver to selectively cause either the full-wave driver to perform the full-wave drive process or the half-wave driver to perform the half-wave drive process.

2. The rotating electric machine system as set forth in claim 1, wherein in the half-wave drive process, the half-wave driver cyclically energizes the permanently-connected switches so that start timings of energization of the permanently-connected switches are offset from each other and each of the permanently-connected switches is energized for half or less of each cycle.

3. The rotating electric machine system as set forth in claim 2, wherein the start timings of energization of the permanently-connected switches are offset from each other by 360°/N in electrical angle.

4. The rotating electric machine system as set forth in claim 1, wherein the electric power conversion circuit further comprises a selector switch controller, and
the selector switch controller controls the selector switch to perform, for each of the N coils, the switching between electrically connecting the selectively-connected terminal of the corresponding selectively-connected switch to the permanently-connected terminal of the corresponding permanently-connected switch and electrically connecting the selectively-connected terminal of the corresponding selectively-connected switch to the neutral point only when the absolute value of electric current flowing in the coil is less than or equal to a threshold current value.

5. The rotating electric machine system as set forth in claim 4, wherein the rotating electric machine further comprises a rotor having a plurality of magnetic poles,
the electric power conversion circuit further comprises an acquiring unit that acquires magnetic pole position information on a magnetic pole position of the rotor, and
the selector switch controller determines, for each of the N coils, whether the absolute value of the electric current flowing in the coil is less than or equal to the threshold current value based on the magnetic pole position information acquired by the acquiring unit.

6. The rotating electric machine system as set forth in claim 4, wherein the selector switch comprises N pairs of first and second connection switches which respectively correspond to the N coils,
for each of the N coils, the first connection switch is configured to electrically connect the selectively-connected terminal of the corresponding selectively-connected switch to the permanently-connected terminal of the corresponding permanently-connected switch and the second connection switch is configured to electrically connect the selectively-connected terminal of the corresponding selectively-connected switch to the neutral point,
the selector switch controller performs first and second switching processes for each of the N coils,
in the first switching process, the selector switch controller turns the corresponding first connection switch from on to off and the corresponding second connection switch from off to on,
in the second switching process, the selector switch controller turns the corresponding first connection switch from off to on and the corresponding second connection switch from on to off, and
in each of the first and second switching processes, there is a time period for which both the corresponding first and second connection switches are kept on by the selector switch controller.

7. The rotating electric machine system as set forth in claim 1, wherein the coils are first coils, the neutral point between the coils is a first neutral point, the high-side switches are first high-side switches, the low-side switches are first low-side switches and the selector switch is a first selector switch,
the permanently-connected switches are respectively configured with the first high-side switches, the selectively-connected switches are respectively configured with the first low-side switches, the permanently-connected terminals are respectively constituted of the low potential-side terminals of the first high-side switches and the selectively-connected terminals are respectively constituted of the high potential-side terminals of the first low-side switches,
the rotating electric machine further comprises N second coils wound on the stator core so as to be electrically insulated from the first coils and respectively belonging to N phases that are different from the N phases of the first coils, the second coils being electrically connected with each other to define a second neutral point therebetween,
the electric power conversion circuit further comprises N second high-side switches, N second low-side switches and a second selector switch,
the N second high-side switches respectively correspond to the N second coils and each have a high potential-side terminal and a low potential-side terminal, all the high potential-side terminals of the second high-side switches being electrically connected to the positive terminal of the DC power source,
the N second low-side switches respectively correspond to the N second coils and each have a high potential-side terminal and a low potential-side terminal, all the low potential-side terminals of the second low-side switches being electrically connected to the negative terminal of the DC power source,
each of the high potential-side terminals of the second low-side switches is permanently electrically connected with a corresponding one of non-second neutral point-side ends of the second coils of the rotating electric machine,
the second selector switch selectively electrically connects each of the low potential-side terminals of the second high-side switches to either a corresponding one of the high potential-side terminals of the second low-side switches or the second neutral point between the second coils,
in the full-wave drive process, the full-wave driver controls on-off switching of the first high-side switches, the first low-side switches, the second high-side switches and the second low-side switches with the high potential-side terminals of the first low-side switches electrically connected with the corresponding low potential-side terminals of the first high-side switches by the first selector switch and the low potential-side terminals of the second high-side switches electrically connected with the corresponding high potential-side terminals of the second low-side switches by the second selector switch, and
in the half-wave drive process, the half-wave driver controls the on-off switching of the first high-side switches and the second low-side switches with the high potential-side terminals of the first low-side switches electrically connected with the first neutral point by the first selector switch and the low potential-side terminals of the second high-side switches electrically connected with the second neutral point by the second selector switch and with the first low-side switches and the second high-side switches kept on.

8. The rotating electric machine system as set forth in claim 7, further comprising:
a positive conductor electrically connected with the positive terminal of the DC power source;
a negative conductor electrically connected with the negative terminal of the DC power source; and
a capacitor electrically connected between the positive and negative conductors,
wherein
each of the high potential-side terminals of the first and second high-side switches is electrically connected with the positive conductor, and
each of the low potential-side terminals of the first and second low-side switches is electrically connected with the negative conductor.

9. The rotating electric machine system as set forth in claim 7, wherein in the half-wave drive process, the half-wave driver cyclically energizes the first high-side switches so that start timings of energization of the first high-side switches are offset from each other and each of the first high-side switches is energized for a first predetermined period in each cycle, the first predetermined period being shorter than or equal to half of each cycle, and
the half-wave driver also cyclically energizes the second low-side switches so that start timings of energization of the second low-side switches are offset from each other and each of the second low-side switches is energized for a second predetermined period in each cycle, the second predetermined period being shorter than or equal to half of each cycle.

10. The rotating electric machine system as set forth in claim 9, wherein the start timings of energization of the first high-side switches are offset from each other by 360°/N in electrical angle, and the start timings of energization of the second low-side switches are also offset from each other by 360°/N in electrical angle.

11. The rotating electric machine system as set forth in claim 10, wherein the first coils and the second coils are wound on the stator core so that each of the first coils has the same spatial phase as a corresponding one of the second coils, and
in the half-wave drive process, the half-wave driver cyclically energizes the first high-side switches and the second low-side switches so that for each same-spatial phase pair of the first and second coils, the start timing of energization of one of the first high-side switches which corresponds to the first coil of the same-spatial phase pair and the start timing of energization of one of the second low-side switches which corresponds to the second coil of the same-spatial phase pair are offset from each other by 180° in electrical angle.

12. The rotating electric machine system as set forth in claim 9, wherein each of the first and second predetermined periods is longer than or equal to (90°+180°/N) and shorter than or equal to 180° in electrical angle.

13. The rotating electric machine system as set forth in claim 12, wherein the first coils and the second coils are wound on the stator core so that each of the first coils has the same spatial phase as a corresponding one of the second coils, and
in the half-wave drive process, the half-wave driver cyclically energizes the first high-side switches and the second low-side switches so that for each same-spatial phase pair of the first and second coils, the start timing of energization of one of the first high-side switches which corresponds to the first coil of the same-spatial phase pair and the start timing of energization of one of the second low-side switches which corresponds to the second coil of the same-spatial phase pair are offset from each other by 180° in electrical angle.

14. The rotating electric machine system as set forth in claim 7, wherein the electric power conversion circuit further comprises first and second selector switch controllers,
the first selector switch controller controls the first selector switch to perform, for each of the N first coils, the switching between electrically connecting the high potential-side terminal of the corresponding first low-side switch to the low potential-side terminal of the corresponding first high-side switch and electrically connecting the high potential-side terminal of the corresponding first low-side switch to the first neutral point only when the absolute value of electric current flowing in the first coil is less than or equal to a first threshold current value, and
the second selector switch controller controls the second selector switch to perform, for each of the N second coils, the switching between electrically connecting the low potential-side terminal of the corresponding second high-side switch to the high potential-side terminal of the corresponding second low-side switch and electrically connecting the low potential-side terminal of the corresponding second high-side switch to the second neutral point only when the absolute value of electric current flowing in the second coil is less than or equal to a second threshold current value.

15. The rotating electric machine system as set forth in claim 7, wherein the first selector switch comprises N pairs of first and second connection switches which respectively correspond to the N first coils,
for each of the N first coils, the first connection switch is configured to electrically connect the high potential-side terminal of the corresponding first low-side switch to the low potential-side terminal of the corresponding first high-side switch and the second connection switch is configured to electrically connect the high potential-side terminal of the corresponding first low-side switch to the first neutral point,
the second selector switch comprises N pairs of third and fourth connection switches which respectively correspond to the N second coils,
for each of the N second coils, the third connection switch is configured to electrically connect the low potential-side terminal of the corresponding second high-side switch to the high potential-side terminal of the corresponding second low-side switch and the fourth connection switch is configured to electrically connect the low potential-side terminal of the corresponding second high-side switch to the second neutral point,
the electric power conversion circuit further comprises a first selector switch controller that controls the first selector switch and a second selector switch controller that controls the second selector switch,
the first selector switch controller performs first and second switching processes for each of the N first coils,
in the first switching process, the first selector switch controller turns the corresponding first connection switch from on to off and the corresponding second connection switch from off to on,
in the second switching process, the first selector switch controller turns the corresponding first connection switch from off to on and the corresponding second connection switch from on to off, in each of the first and second switching processes, there is a time period for which both the corresponding first and second connection switches are kept on by the first selector switch controller, the second selector switch controller performs third and fourth switching processes for each of the N second coils, in the third switching process, the second selector switch controller turns the corresponding third connection switch from on to off and the corresponding fourth connection switch from off to on, in the fourth switching process, the second selector switch controller turns the corresponding third connection switch from off to on and the corresponding fourth connection switch from on to off, and in each of the third and fourth switching processes, there is a time period for which both the corresponding third and fourth connection switches are kept on by the second selector switch controller.

* * * * *